United States Patent
Frenger et al.

(10) Patent No.: US 12,445,174 B2
(45) Date of Patent: Oct. 14, 2025

(54) METHODS, UE AND APU FOR HANDLING DATA TRANSMISSIONS IN A DISTRIBUTED MIMO SYSTEM

(71) Applicant: Telefonaktiebolaget LM Ericsson (PUBL), Stockholm (SE)

(72) Inventors: Pål Frenger, Linköping (SE); Erik G. Larsson, Linköping (SE); Emil Björnson, Hägersten (SE); Martin Hessler, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 602 days.

(21) Appl. No.: 17/766,765

(22) PCT Filed: Oct. 8, 2019

(86) PCT No.: PCT/SE2019/050981
§ 371 (c)(1),
(2) Date: Apr. 6, 2022

(87) PCT Pub. No.: WO2021/071398
PCT Pub. Date: Apr. 15, 2021

(65) Prior Publication Data
US 2023/0318667 A1 Oct. 5, 2023

(51) Int. Cl.
*H04B 7/0456* (2017.01)
*H04L 5/00* (2006.01)

(52) U.S. Cl.
CPC ......... *H04B 7/0456* (2013.01); *H04L 5/0048* (2013.01)

(58) Field of Classification Search
CPC ...... H04B 7/0456; H04B 7/024; H04B 7/063; H04B 7/0695; H04L 5/0048; H04L 5/006; H04L 5/0035
See application file for complete search history.

(56) References Cited

U.S. PATENT DOCUMENTS 11,329,708 B2 * 5/2022 Li ..................... H04B 7/0634
2017/0223653 A1 * 8/2017 Weitnauer ......... H04W 56/0045
(Continued)

FOREIGN PATENT DOCUMENTS

EP 2 273 691 A1 1/2011
EP 2 663 115 A1 11/2013
(Continued)

OTHER PUBLICATIONS

Seungnyun Kim et al., Downlink Pilot Precoding and Compressed Channel Feedback for FDD-Based Cell-Free Systems—Sep. 16, 2019.
(Continued)

*Primary Examiner* — Yu-Wen Chang
(74) *Attorney, Agent, or Firm* — Weisberg I.P. Law, P.A.

(57) ABSTRACT

The embodiments herein relate to a method performed by an APU (103) for handling data transmissions in a distributed massive MIMO communication system (100). The APU (103) is comprised in one of at least two non-co-located groups of APUs (103) in the system (100). The APU (103) determines a first pre-coding configuration and a DL reference signal. The APU (103) transmits, to a UE (125), the DL reference signal pre-coded with the first pre-coding configuration. The APU (103) receives information indicating at least one phase adjustment parameter from the UE (125), and determines a second pre-coding configuration based on the first pre-coding configuration adjusted with the phase adjustment parameter. The APU (103) transmits DL data pre-coded with the second pre-coding configuration to the UE (125).

17 Claims, 21 Drawing Sheets

(56) References Cited

U.S. PATENT DOCUMENTS

| | | | | |
|---|---|---|---|---|
| 2018/0006700 | A1* | 1/2018 | Frenne | H04B 7/0626 |
| 2018/0091274 | A1 | 3/2018 | Islam et al. | |
| 2020/0052756 | A1* | 2/2020 | Raghavan | H04B 7/088 |
| 2020/0083938 | A1* | 3/2020 | Park | H04B 7/0456 |
| 2020/0084787 | A1* | 3/2020 | Hao | H04L 5/005 |
| 2020/0091978 | A1* | 3/2020 | Noh | H04B 7/0695 |
| 2020/0119897 | A1* | 4/2020 | Zhang | H04W 72/12 |
| 2020/0204239 | A1* | 6/2020 | Kang | H04B 7/0632 |
| 2021/0320694 | A1* | 10/2021 | Zhong | H04L 25/03343 |
| 2022/0217567 | A1* | 7/2022 | Ren | H04B 7/0626 |
| 2022/0329304 | A1* | 10/2022 | Ahmed Salem | H04B 7/0658 |

FOREIGN PATENT DOCUMENTS

| | | |
|---|---|---|
| WO | 2012 108912 A1 | 8/2012 |
| WO | 2012 129937 A1 | 10/2012 |
| WO | 2017 121209 A1 | 7/2017 |
| WO | 2018 103897 A1 | 6/2018 |

OTHER PUBLICATIONS

Giovanni Interdonato et al., How Much Do Downlink Pilots Improve Cell-Free Massive MIMO?, Department of Electrical Engineering (ISY), Linkoping University, Sweden, IEEE—2016.

Nima N. Moghadam et al., Pilot Precoding and Combining in Multiuser MIMO Networks—Nov. 7, 2016.

PCT International Serach Report issued for International application No. PCT/SE2019/050981—Sep. 3, 2020.

Giovanni Interdonato et al., Ubiquitous cell-free Massive MIMO communications, Department of Electrical Engineering, Linkoping University, Sweden—Sep. 6, 2019 International Searching Authority issued for International application 3, 2020.

PCT Written Opinion of the International Searching Authority issued for International application No. PCT/SE2019/050981—Sep. 3, 2020.

3GPP TSG RAN WG1 Meeting #68; Dresden, Germany; Source: Alcatel-Lucent Shanghai Bell, Alcatel-Lucent; Title: Analysis of inter-CSI-RS-resource phase feedback (R1-120492)—Feb. 6-10, 2012.

3GPP TSG-RAN WG1 #87; Reno, Nevada, USA; Source: Qualcomm Incorporated; Title: Discussion on CSI Acquisition (R1-1612057)—Nov. 14-18, 2016.

Extended European Search Report issued for Application No. / Patent No. 19948544.2-1206 / 4042583 PCT/SE2019050981—Sep. 16, 2022.

* cited by examiner

METHODS, UE AND APU FOR HANDLING DATA TRANSMISSIONS IN A DISTRIBUTED MIMO SYSTEM

PRIORITY

This nonprovisional application is a U.S. National Stage Filing under 35 U.S.C. § 371 of International Patent Application Serial No. PCT/SE2019/050981 filed Oct. 8, 2019 and entitled "Methods, UE and APU for Handling Data Transmissions in a Distributed MIMO System" which is hereby incorporated by reference in its entirety.

TECHNICAL FIELD

Embodiments herein relate generally to an Antenna Processing Unit (APU), a method performed by the APU, a User Equipment (UE), a method performed by the UE. More particularly the embodiments herein relate to handling data transmissions in a distributed massive Multiple Input Multiple Output (MIMO) system.

BACKGROUND

Conventional cellular communication networks comprises a set of access nodes, e.g. base stations, equipped with an array of co-located antenna elements, each forming one or multiple antenna ports. When a UE has data packets to receive in the downlink (DL) or transmit in the uplink (UL), it is first associated with one of the access nodes and then it is scheduled for transmission on a block of time-frequency resources. In these resource blocks, the serving access node array forms a beam towards the UE, with a spatial signature that is selected based on the spatial position of the UE and co-UEs that are active in the same resource block. The beam is typically selected to balance between high received signal power at the UE and little interference towards the co-UEs. Each access node and the UEs that it serves constitute a cell, and all desired transmission goes on within the cell. Resource allocation tasks, such as scheduling, power control, and assignment of pilot sequences, are also implemented on a per-cell basis.

An alternative approach to network deployment is to spread out the antenna elements over the coverage area of the access node, using many remote-radio heads, also known as Access Points (APs), or APUs. Different from conventional cellular communication networks, where the access nodes are surrounded by UEs, the UEs will be surrounded by AP antennas that can all potentially serve them simultaneously. This enables a cell-free network operation where each UE is served by its preferred set of APs. Large-scale deployment of such networks is known as "Cell-free Massive MIMO". The physical-layer processing is partially done locally at each AP, using UL measurements from reference signals. A reference signal may also be referred to as a pilot or a pilot signal. An attractive way to deploy these networks is to use radio stripes, where multiple APUs are deployed along the same cable and thereby shares the same fronthaul connection. This leads to much less cabling compared to the star-topology where each AP has a dedicated fronthaul connection.

Radio stripes, also referred to as a radio stick, an antenna stripe or an antenna stick, is an implementation of distributed massive MIMO where small APs, i.e. antennas, are placed on a stripe, with all electronics and fronthaul integrated into that stripe. An example of a radio stripe system is depicted in FIGS. 1a, 1b and 1c. FIG. 1a illustrates the radio stripe system. FIG. 1b illustrates a part of one of the radio stripes 101 in the radio stripe system of FIG. 1a. FIG. 1c shows one of the APUs 103 comprised in the radio stripe 101 of FIG. 1b.

A radio stripe 101 may e.g. be a semi-flexible device with small circuit boards comprising everything shown in FIG. 1b. In-between these circuit boards are just the fronthaul cabling, i.e. power and data. Hence, a radio stripe 101 may look like an Ethernet cable with small "bumps" evenly spaced along the cable.

In more detail, FIG. 1a illustrates a radio stripe system comprising two Central Processing Units (CPU) 105 with four radio stripes 101 each. The radio stripes 101 are illustrated as thick lines. The thin lines between the radio stripes 101 represent the internal fronthaul cabling inside the radio stripe 101. The radio stripes 105 are connected via a CPU 105, and the CPUs 105 are adapted to communicate with each other through a backhaul interface. Note that the number of radio stripes 101 and CPUs 105 illustrated in FIG. 1a is only an example, and that any other suitable number of radio stripes 105 and CPUs 105 is equally applicable.

The thin lines between the radio stripes 101 in FIG. 1a represent sections of the radio stripe 101 comprising of only fronthaul cables providing data and power to the APUs 103 The thicker sections of the radio stripe 101 represents sections of the radio stripe 101 where small circuit boards are located comprising the APUs 103 and antenna element groups 108.

FIG. 1b illustrates a part of a radio stripe 105. The radio stripe 101 is illustrated to comprise two APUs 103, but any other suitable number of APUs 103 may be comprised in the radio stripe 101. Each APU 103 is illustrated to comprise two antenna element groups 108, e.g. a first antenna element and a second antenna element. Each antenna element group is shown as a "cross" in FIG. 1b and comprises a pair of cross polarized antenna elements. The antenna element group 108 may also be referred to as an antenna element pair. The two antenna element groups 108 may be located on opposite sides of the APU 103, or on the same side of the APU 103, e.g. on top of the APU 103. The radio stripe 101 comprises an internal connector 110 which may be e.g. power, fronthaul, a clock etc. The radio stripe 105 may be surrounded by or located within a casing 113. The casing 113 may be referred to as a protective casing or a casing of a protective material. The casing 113 is adapted to protect the units comprised in the casing 113. The two arrows below the APUs 103 in FIG. 1b represent data transfer from the shared fronthaul data bus to this individual APU 103. A fronthaul may be described as a fronthaul cable, a fronthaul connect, a fronthaul data bus, a fronthaul link etc. The fronthaul may also be referred to as a mobile fronthaul, a connection or an intermediate connection.

FIG. 1c illustrates one of the APUs 103 in a radio stripe 105. As mentioned above, the APU 103 comprises two antenna elements 108. The two antenna elements 108 are illustrated to be located on opposite sides of the APU 103. The APU 103 is illustrated to comprise a Digital Signalling Processor (DSP) 115. The DSP 115 may be adapted to be connected to a set of Analogue to Digital (A/D) converters 118 and a set of Digital to Analogue (D/A) converters 120. The APU 103 may further comprise analogue filtering circuitry, in-phase (I) and quadrature phase (Q) modulation circuitry, mixers, power amplifiers, and low noise amplifiers (LNAs).

Antenna elements 108 and the associated APUs 103 are serially located inside the same cable, which also provides synchronization, data transfer, and power supply via a shared bus, i.e. the internal connector 110. Specifically, the actual APs comprise antenna elements 108 and circuit-mounted chips inside the casing 113 of a cable or a stripe. Each radio stripe is then connected to one or multiple CPUs. The circuit-mounted chips comprise power amplifiers, phase shifters, filters, modulators, A/D converters 118 and D/A converters 120. Since the total number of distributed antenna element groups 108 is assumed to be large in comparison to a number of active UEs 125, e.g. more than 50, the transmit power of each antenna element group 108 can be very low, e.g. the power per antenna element group 108 on the APU side is typically smaller than the UE transmission power, resulting in low heat-dissipation, small volume and weight, and low cost. Low heat-dissipation may be a single-digit Watt of thermal heat dissipation design, e.g. 1-2 W. The smaller volume, the better, and an example of a volume may be around 1 cm². The cost depends on quantity, i.e. a large quantity is associated with a lower cost than a small quantity. The first one could be extremely expensive to design. Small low-gain antenna groups 108 are used. Small low-gain may be for example 0 dBi. For example, if the carrier frequency is 5.2 GHz then the antenna element group 108 size is 2.8 cm, thus, the antenna element group 108 and processing hardware of the APU 103 can be easily fitted in a an antenna stripe 101.

An Access Point (AP) may comprise one or more APUs 103.

The receive and/or transmit processing of an antenna element group 108 is performed right next to itself. On the transmitter side, each APU 103 receives multiple streams of input data, e.g., one stream per UE, one UE with multiple streams, or some other UE-stream allocation, from the previous APU 103 via the internal connector 110, e.g. the shared bus. In each downlink antenna branch, the input data streams are scaled with the pre-calculated pre-coding vector and the sum-signal is transmitted over the radio channel to the UE receiver(s). By exploiting channel reciprocity, the pre-coding vector may be a function of the estimated uplink channels. For example, if the conjugate of the estimated uplink channel is used, Maximum Ratio (MR) pre-coding is obtained. This pre-coding requires no Channel State Information (CSI) sharing between the antenna processing units 103.

On the UL, the signal received by an APU 103 is multiplied with the combining vector previously calculated in the uplink pilot phase. The output gives data streams that are then combined with the data streams received from the internal connector 110, e.g. the shared bus, and sent again on the internal connector 110 to the next APU 103.

The radio stripe system facilitates a flexible and cheap cell-free massive MIMO deployment. FIG. 2 illustrates an example deployment of a distributed massive MIMO system using radio stripes 101. FIG. 2 illustrates four radio stripes 101, but any other suitable number of radio stripes 101 is applicable. Each radio stripe 101 comprises a plurality of APUs 103. The number of APUs 103 comprised in each radio stripe 101 may be the same or it may be different. One or several APUs 103 may be comprised in two or more radio stripes, i.e. two or more radio stripes 101 may have one or more common APUs 103. A plurality of UEs 125 is shown in FIG. 2 and is adapted to communicate with the APUs 103 in the radio stripes 101. One UE 125 may be adapted to communicate with one or a plurality of radio stripes 101. A CPU 105 is adapted to communicate with each of the radio stripes 101.

A reference system architecture of a radio stripe system is depicted in FIG. 3. FIG. 3 illustrates four radio stripes 101, i.e. radio stripe no. #1,1, radio stripe number #p, 1, radio stripe number #P, 1 and radio stripe number #1, S, where p, P and S are positive integers.

Each radio stripe 101 comprises one or more APUs 103. In FIG. 3, each APU 103 is illustrated to comprise an APU number 0, an APU number k and an APU number K, where k and K are positive integers. The APUs 103 are responsible for performing the antenna pre-coding function in the downlink and for performing the antenna receive combination in the uplink. They may also be responsible for calculation of local beamforming related parameters, e.g. downlink pre-coding and uplink combining weights, uplink and downlink power control parameters. One APU 103 is connected to its neighbour APU 103 via an on-stripe bus 130. All APUs 103 comprised in each radio stripe 101 are connected to an internal connector 110. The internal connector 110 may also be referred to as a pass-through bus, e.g. data, power, synchronization. Each APU 103 is connected to two antenna elements 108, illustrated with one box in FIG. 3.

Each radio stripe 101 comprises two stripe interfaces 133, each in different ends of the radio stripe 101.

Each radio stripe 101 is adapted to be connected to a CPU 105, e.g. via the stripe interface 113. One CPU 105 may be connected to another CPU 105, e.g. via a CPU-to-CPU interface 135. A backhaul interface 140 is a connection between two different CPUs 105. The backhaul interface 140 may also be referred to as a backhaul connection or a backhaul.

The CPU 105 is responsible for, among other things, physical layer functions not performed in the APUs 103, e.g. modulation/demodulation, channel encoding/de-coding, scheduling, etc., and possibly higher layer functions. The CPU 105 is responsible for calculation of global beamforming related parameters, e.g. global pre-coding/combining weights. The CPU 105 is also responsible for overall coordination of the system operation such as determining APU 103 and UE associations, etc. In case a UE 125 is handed over to another CPU 105 or in case the transmission and/or reception is to be coordinated through another CPU 105 the controlling CPU 105 for the UE 125 is also responsible for coordinating and executing those functions.

With current technology it is difficult and expensive to achieve phase coherent transmission over large distance. This is especially the case for high frequency bands.

It is much simpler to implement a (semi-)distributed massive MIMO system that is only locally phase coherent but not globally phase coherent. In the reference architecture shown in FIG. 3 it is reasonable to assume that phase coherent transmission from multiple antenna elements 108 are only possible within a group of nearby antenna elements 108, such as those within the same radio stripe 101 or even within the same APU 103.

FIG. 4 illustrates phase coherent transmission from all antenna elements 108 comprised in "Radio stripe #1,1" 101. Using other words, FIG. 4 illustrates phase coherent transmission from a group of adjacent and nearby antenna elements 108 to a desired UE 125, e.g. UE1. A group of antenna elements 108 may be seen as comprised in a radio stripe 101.

FIG. 4 shows two UEs 125, i.e. a first UE 125 indicated as UE1 and a second UE 125 indicated as UE2. The first UE 125 is referred to as a desired UE, and the second UE 125 is referred to as an interfered UE. FIG. 4 shows two radio stripes 101, i.e. radio stripe #1,1 and radio stripe #1,S. The other entities shown in FIG. 4 will not be described since they are described in detail with reference to FIG. 3. The beamforming weights are calculated using a method that achieves the two targets to (1) ensure that signal components add coherently at a desired UE 125, e.g. UE1 and (2) that they add destructively at a non-desired UE 125, e.g. UE2. Note that beamforming in a distributed MIMO system concentrate the energy to a point in space rather than in a direction. Interference is generated everywhere except in certain points in space where other users are located. The solid arrows in FIG. 4 represent a desired signal intended for UE1 125. The dashed arrows represent interference from the transmission to the UE1 125 that reaches UE2 125.

In FIG. 5 another radio stripe 101 is serving the other UE 125, i.e. UE2. Using other words, FIG. 5 illustrates phase coherent transmission from a group of adjacent and nearby antenna elements to a desired UE 125, i.e. UE2. A difference between FIG. 4 and FIG. 5 is that in FIG. 4, the desired UE 125 is the left UE and the interfered UE 125 is the right UE. In FIG. 5, the desired UE 125 is the right UE and the interfered UE 125 is the left UE. The other entities shown in FIG. 5 will not be described since they are described in detail with reference to FIG. 3. Since the transmissions from the first radio stripe 101 to the first UE 125, i.e. UE1, does not generate interference to the other UE 125, i.e. UE2, and vice versa the signal to noise plus interference (SINR) at the intended UEs 125 can be high.

However, this solution does not solve problems with radio blocking and it does not provide much macro diversity. Hence it is far from an optimum solution, which is a problem.

Therefore, there is a need to at least mitigate or solve this issue.

SUMMARY

An objective of embodiments herein is therefore to obviate at least one of the above disadvantages and to provide improved handling of data transmissions in a distributed massive MIMO communication system.

According to a first aspect, the object is achieved by a method performed by an APU for handling data transmissions in a distributed massive MIMO communication system. The APU is comprised in one of at least two non-co-located groups of APUs in the system. The APU determines a first pre-coding configuration and a DL reference signal. The APU transmits, to a UE, the DL reference signal pre-coded with the first pre-coding configuration. The APU receives information indicating at least one phase adjustment parameter from the UE, and determines a second pre-coding configuration based on the first pre-coding configuration adjusted with the phase adjustment parameter. The APU transmits DL data pre-coded with the second pre-coding configuration parameter to the UE.

According to a second aspect, the object is achieved by a method performed by a UE for handling data transmissions in a distributed massive MIMO communication system. The UE receives a DL reference signal pre-coded with a first pre-coding configuration from a plurality of APUs comprised in at least two groups of non-co-located APUs in the system The UE determines phase difference between the received DL reference signals. The UE determines at least one phase adjustment parameter based on the phase difference, and transmits information indicating the at least one phase adjustment parameter to at least one APU in the plurality. The UE receives DL data pre-coded with a second pre-coding configuration from each of the APUs in the plurality According to a third aspect, the object is achieved by an APU for handling data transmissions in a distributed massive MIMO communication system. The APU is comprised in one of at least two non-co-located groups of APUs in the system. The APU is adapted to determine a first pre-coding configuration and a DL reference signal. The APU is adapted to transmit, to a UE, the DL reference signal pre-coded with the first pre-coding configuration. The APU is adapted to receive information indicating at least one phase adjustment parameter from the UE, and to determine a second pre-coding configuration based on the first pre-coding configuration adjusted with the phase adjustment parameter. The APU is adapted to transmit DL data pre-coded with the second pre-coding configuration to the UE.

According to a fourth aspect, the object is achieved by a UE for handling data transmissions in a distributed massive MIMO communication system. The UE is adapted to receive a DL reference signal pre-coded with a first pre-coding configuration from a plurality of APUs comprised in at least two groups of non-co-located APUs in the system. The UE is adapted to determine phase difference between the received DL reference signals, and to determine least one phase adjustment parameter based on the phase difference. The UE is adapted to transmit information indicating the at least one phase adjustment parameter to at least one APU in the plurality, and to receive DL data pre-coded with a second pre-coding configuration from each of the APUs in the plurality.

Since the feedback from the UE to the APU with information indicating at least one phase adjustment parameter, the second pre-coding configuration, determined based on the phase adjustment parameter, is applied to the transmitted DL data, i.e. the DI data transmissions in the communications system are phase coherent which provides improved handling of data transmissions in a distributed massive MIMO communication system.

Embodiments herein afford many advantages, of which a non-exhaustive list of examples follows:

The embodiments herein provide an efficient solution to the problem of doing transmission beamforming when phase coherent transmission can only be achieved over closely located antenna elements and not over antenna elements that are located far from each other.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 6:
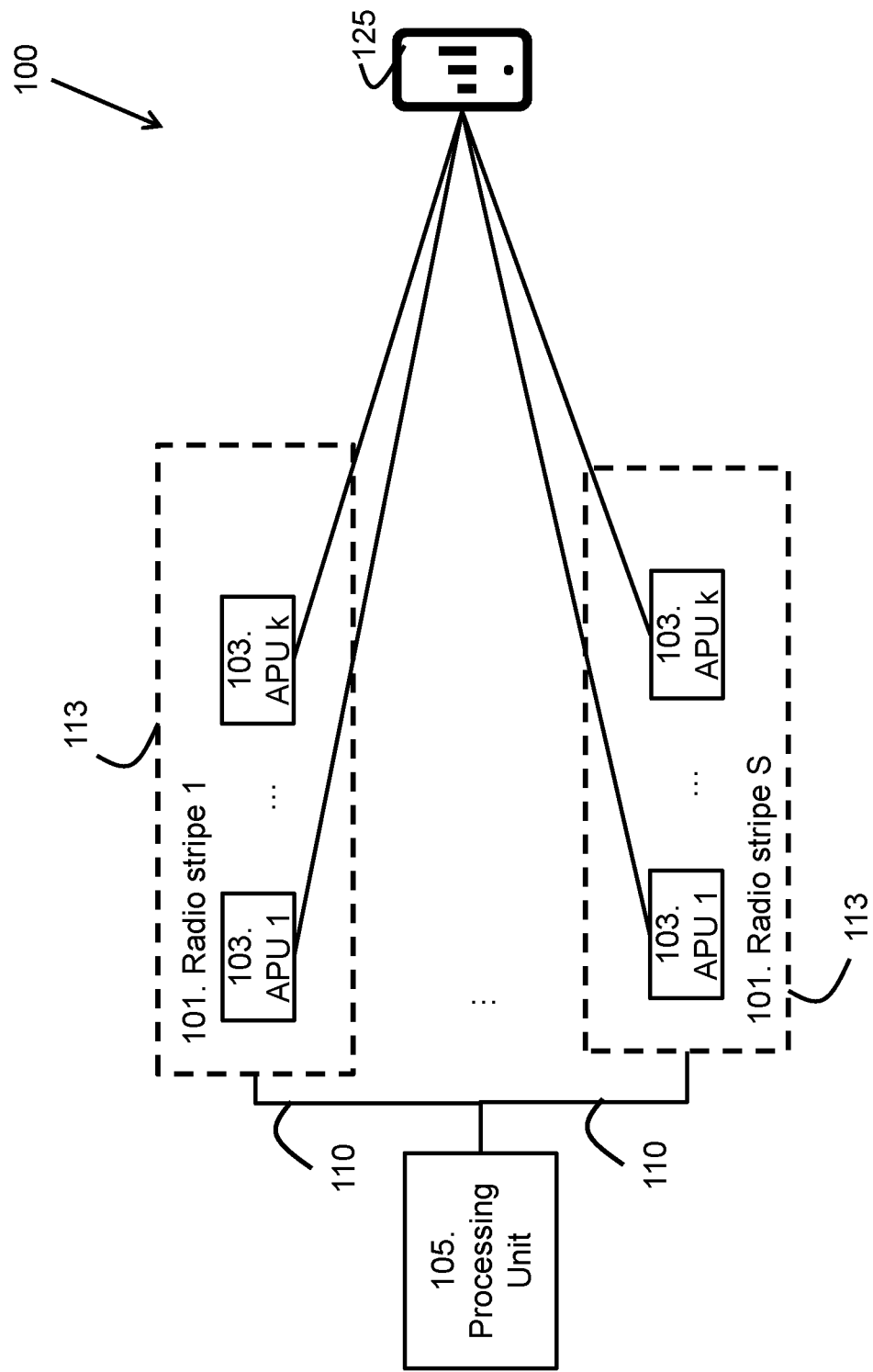
FIG. 6 is a schematic diagram illustrating a distributed massive MIMO communication system.

FIG. 6 depicts a distributed massive MIMO communication system 100 in which embodiments herein may be implemented. The term system together with the reference number 100 may be used for the sake of simplicity herein when referring to the distributed massive MIMO communication system 100. The communications network 100 may in some embodiments apply to one or more radio access technologies such as for example 2G, 2G, 4G, 5G or any other current or future 3GPP radio access technology, or other radio access technologies such as e.g. Wireless Local Area Network (WLAN).

Figure 1:
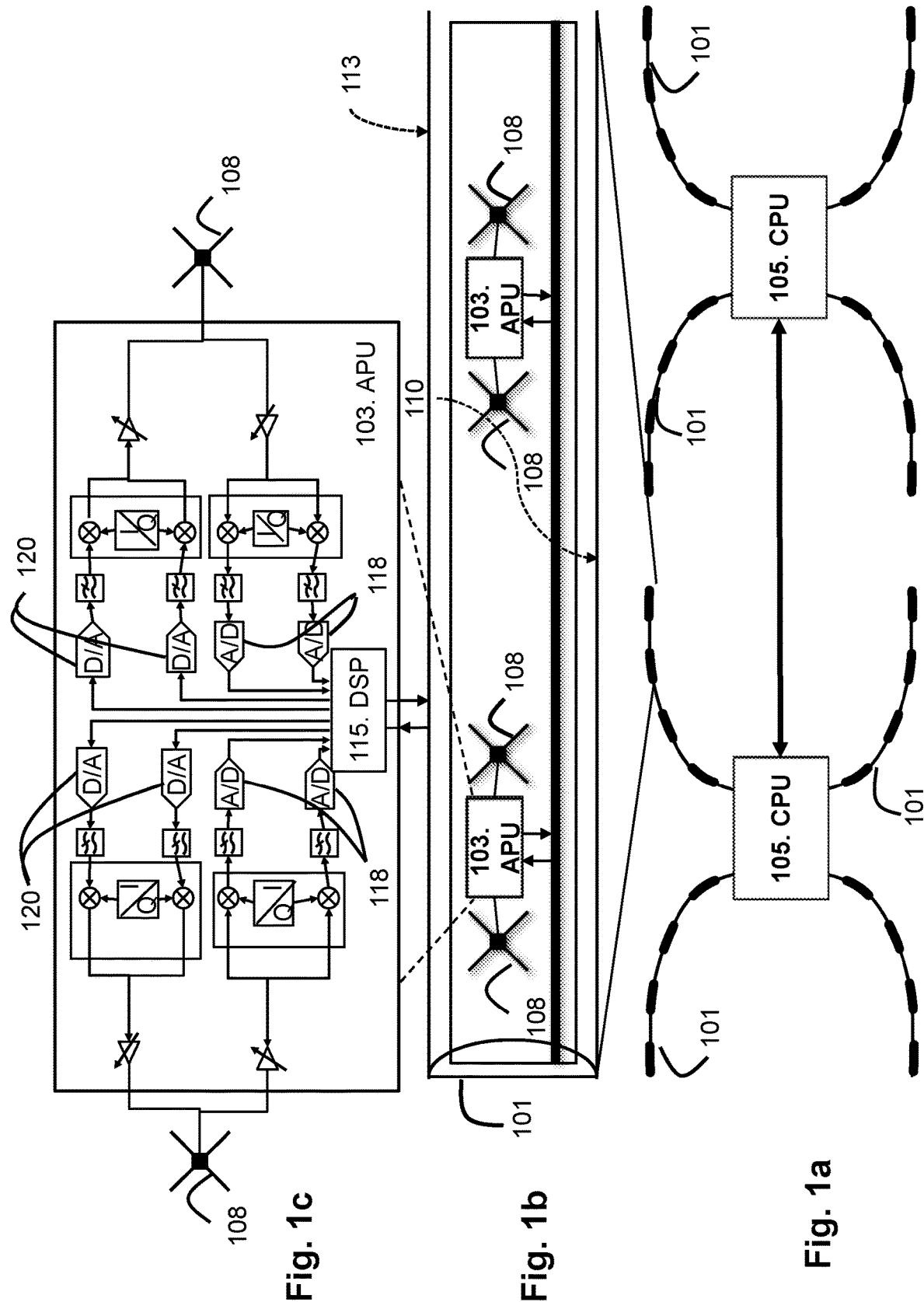
FIGS. 1*a*, 1*b* and 1*c* are schematic diagrams illustrating a radio stripe system.
Figure 2:
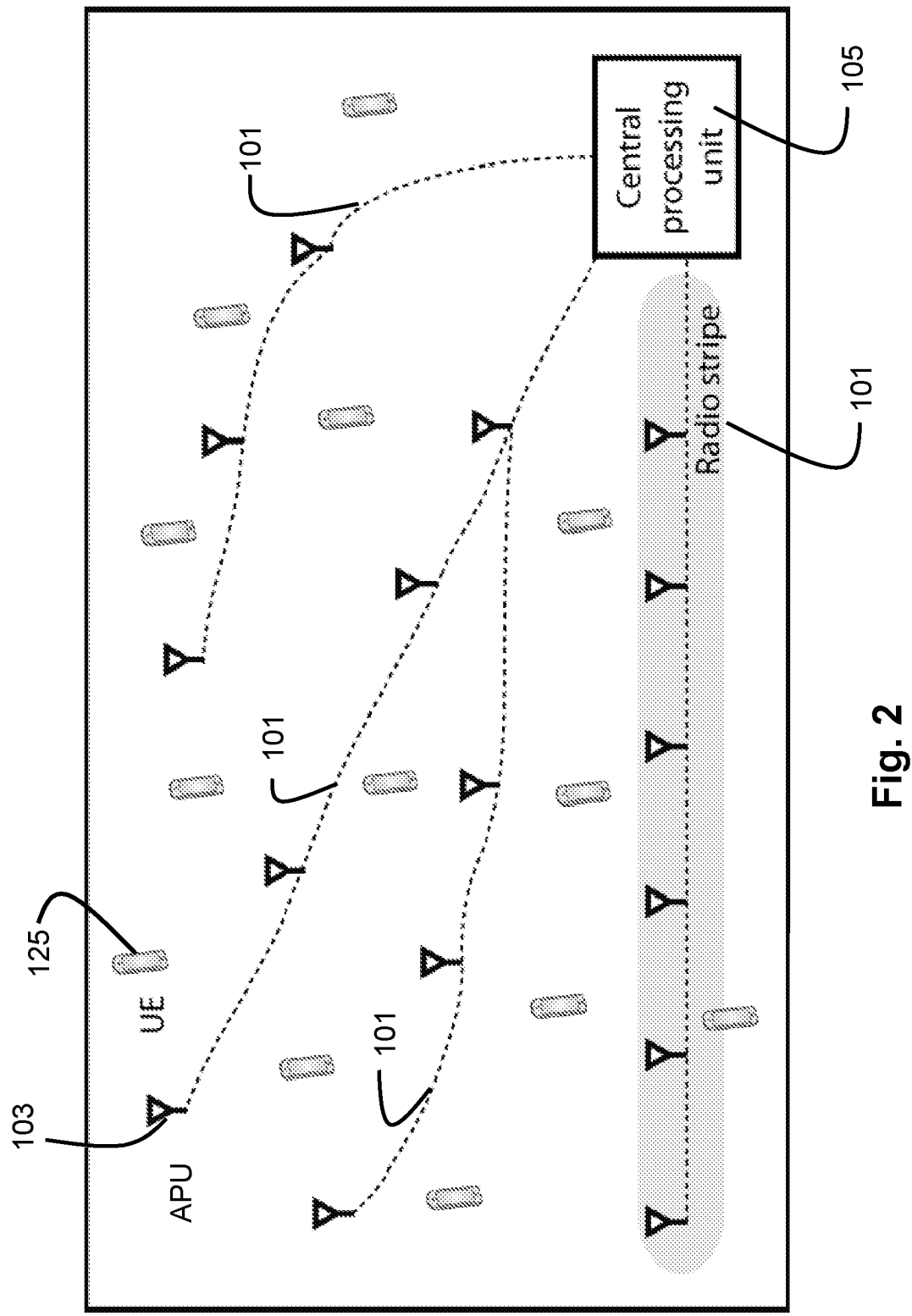
FIG. 2 is a schematic diagram illustrating a distributed massive MIMO system with radio stripes.
Figure 3:
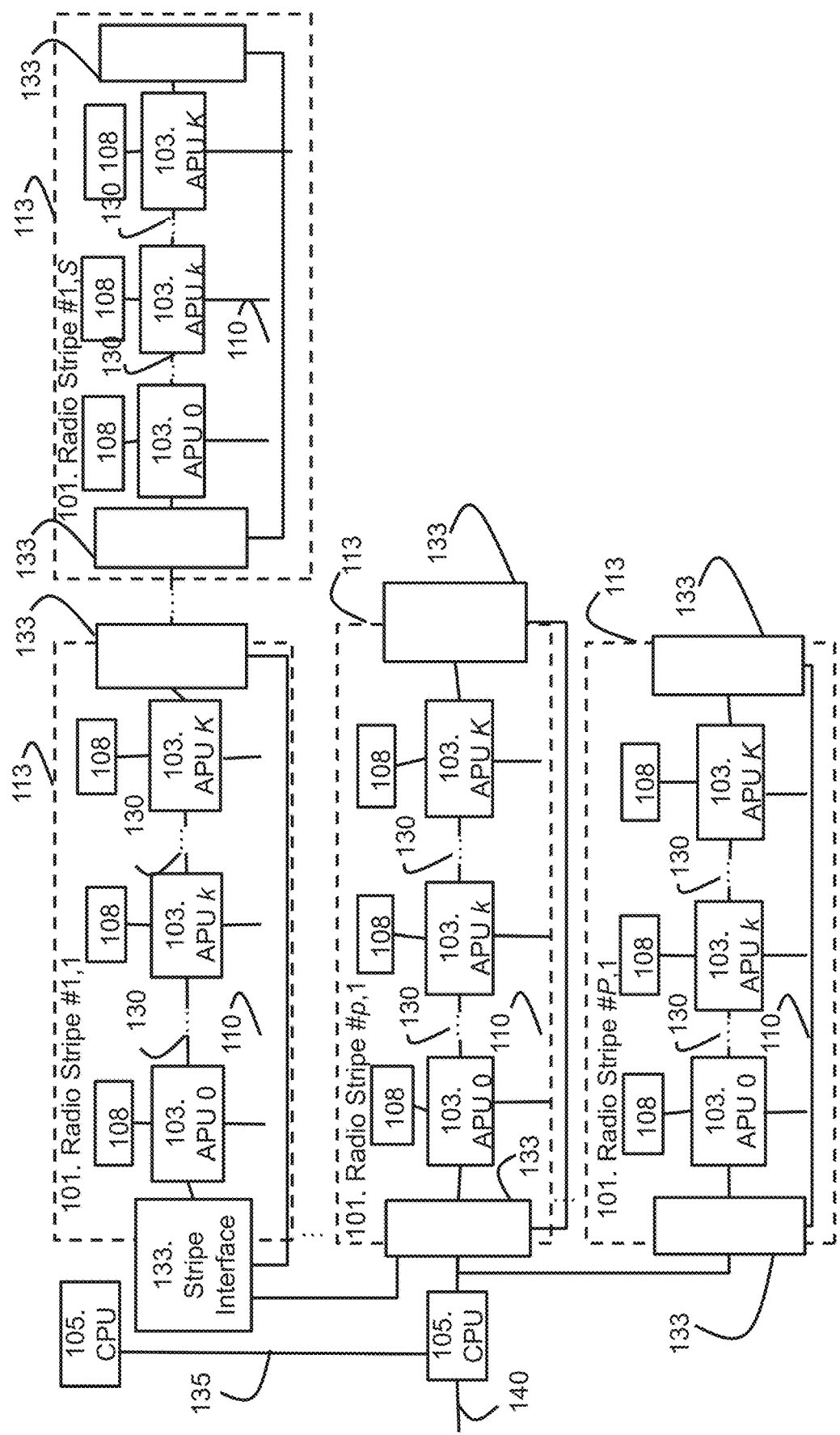
FIG. 3 is a schematic diagram illustrating a radio stripe system.
Figure 4:
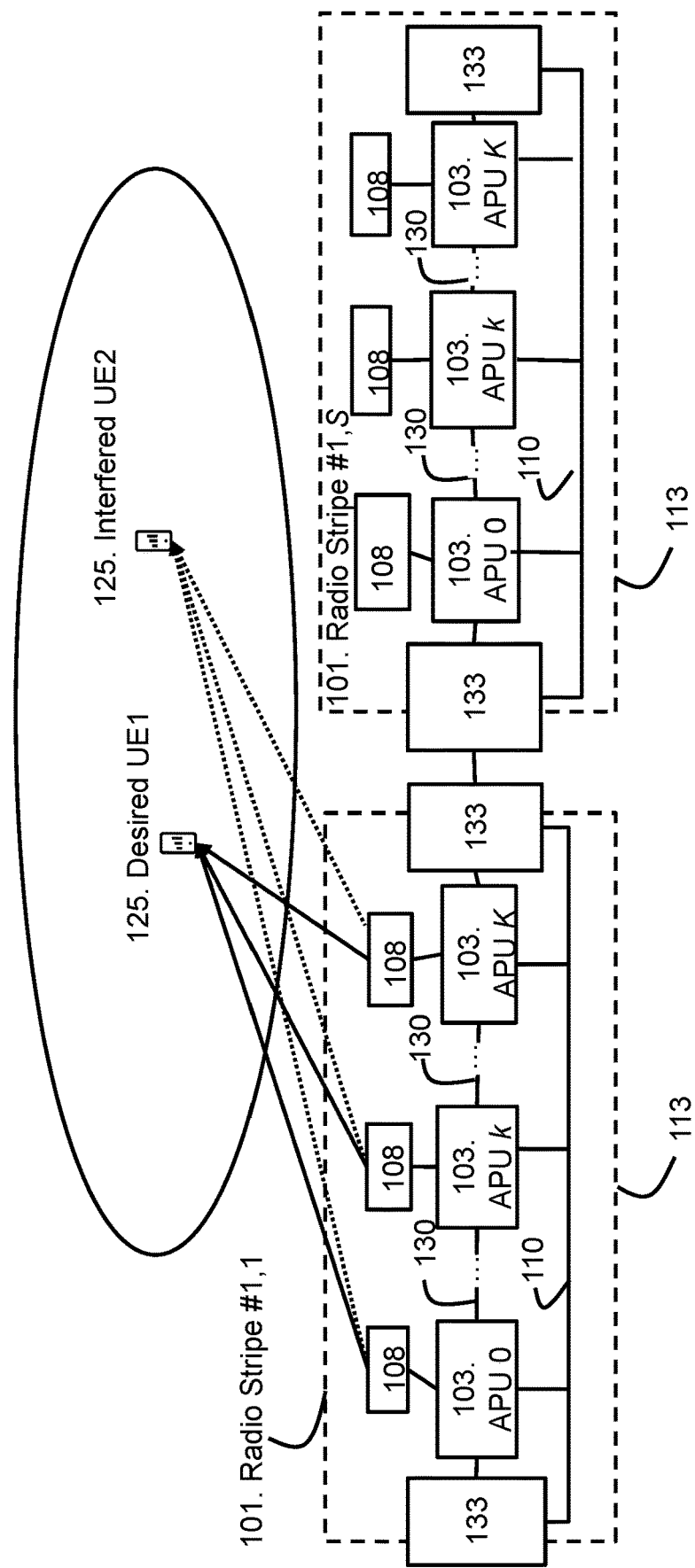
FIG. 4 is a schematic diagram illustrating phase coherent transmission from a group of adjacent and nearby antenna elements to a desired UE.
Figure 5:
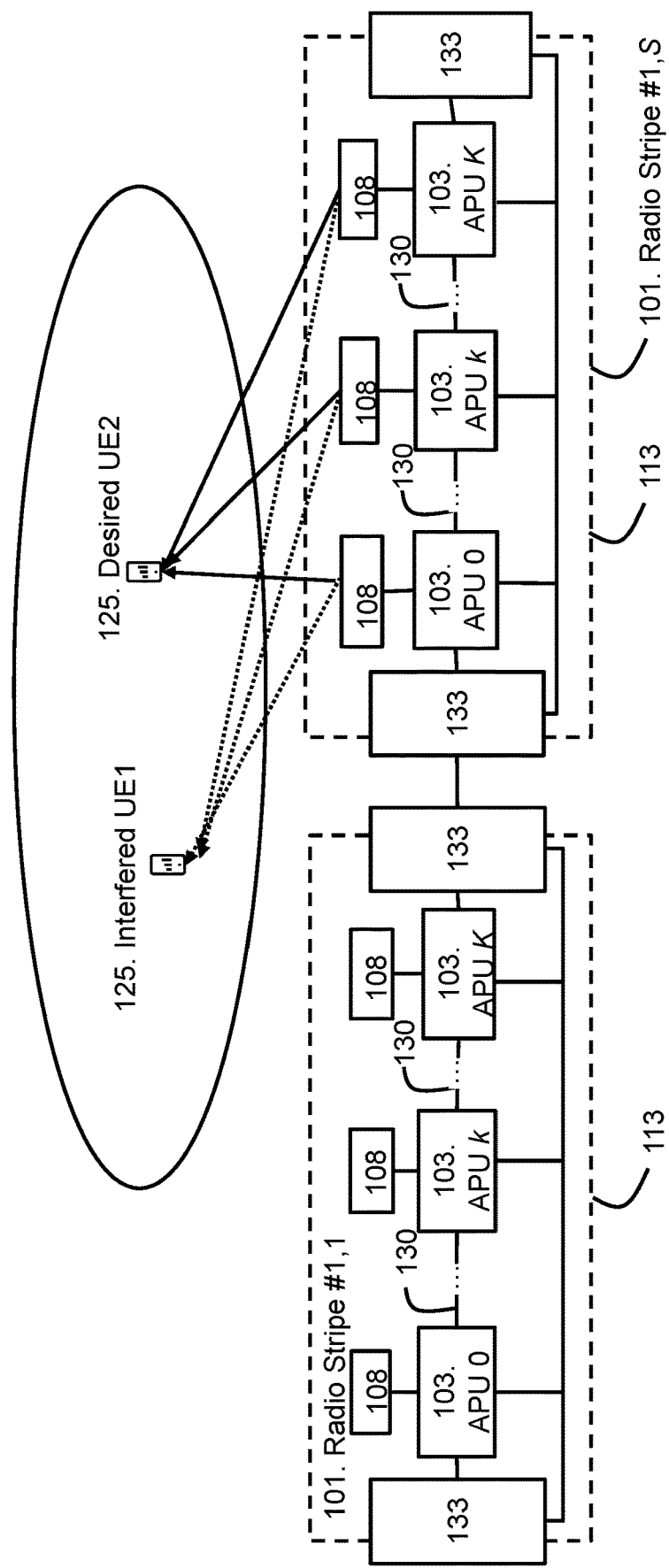
FIG. 5 is a schematic diagram illustrating phase coherent transmission from a group of adjacent and nearby antenna elements to a desired UE.

The system 100 comprises at least two radio stripes 101. This may also be described as the system 100 comprises 2×S radio stripes 101, where S is a positive integer, the system 100 comprises a plurality of radio stripes 101, multiple radio stripes 101 etc. Each radio stripe 101 comprises at least one APU 103. The term at least one APU 103 may also be referred to as k number of APUs 103, where k is a positive integer. An APU 103 may also be referred to as being comprised in a group of APUs 103, and the group corresponds to a radio stripe. Thus, the APU 103 is comprised in a radio stripe. A group of APUs 103 may comprise one or more APUs 103. When a radio stripe 101 comprises more than one APU 103, then the APUs 103 within the radio stripe 101 may be connected to its neighbour APU 103 via an on-stripe bus 130 (not shown in FIG. 6, but it is shown in e.g. FIG. 5). Each radio stripe 101 may comprise stripe interfaces 133, antenna elements 108 etc. (not shown in FIG. 5, but they are shown in e.g. FIG. 7). Each radio stripe 101 is comprised in a casing 113, as described with reference to e.g. FIG. 1b above.

A UE 125 is comprised in the system 100 and is adapted to transmit and/or receive signals, data, information etc. to each of the APUs 103 in each radio stripe 101. The UE illustrated in FIG. 6 may be the desired UE or the interfered UE, i.e. UE1 or UE2 described herein, and when the term UE 125 is used herein, it refers to any of these UEs. The UE 125 may be a device by which a subscriber may access services offered by an operator's network and services outside operator's network to which the operator's radio access network and core network provide access, e.g. access to the Internet. The UE 125 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device, terminal device, communication device or any type of consumer electronic, for instance but not limited to television, radio, lighting arrangements, tablet computer, laptop or Personal Computer (PC). The UE 125 may be portable, pocket storable, hand held, computer comprised, or vehicle mounted devices, enabled to communicate voice and/or data, via the radio access network, with another entity, such as another UE or a server.

Each radio stripe 101 may be adapted to be connected to a processing unit 105 via a backhaul 140.

It should be noted that the communication links in the communications network may be of any suitable kind including either a wired or wireless link. The link may use any suitable protocol depending on type and level of layer, e.g. as indicated by the Open Systems Interconnection, (OSI) model, as understood by the person skilled in the art.

The method for data transmissions in a distributed massive MIMO communication system 100 will now be described with reference to the signalling diagrams depicted in FIG. 7, FIG. 8 and FIG. 9. These three figs. show the system 100 comprising one UE 125, e.g. a desired UE 125, a first APU 103 comprised in a first radio stripe 101 and a second APU 103 comprised in a second radio stripe 101. However, the system 100 may comprise any other number of UEs 124 and any other number of radio stripes 101, and each radio stripe 101 may comprise any other number of APUs 103. Where the three figs. comprise corresponding steps, then only the steps for FIG. 7 will be described for the sake of simplicity. When there are differences between the steps in the three figs., then these differences are described in detail. The method comprises at least one of the following steps, which steps may as well be carried out in another suitable order than described below.

Step 701

Figure 8:
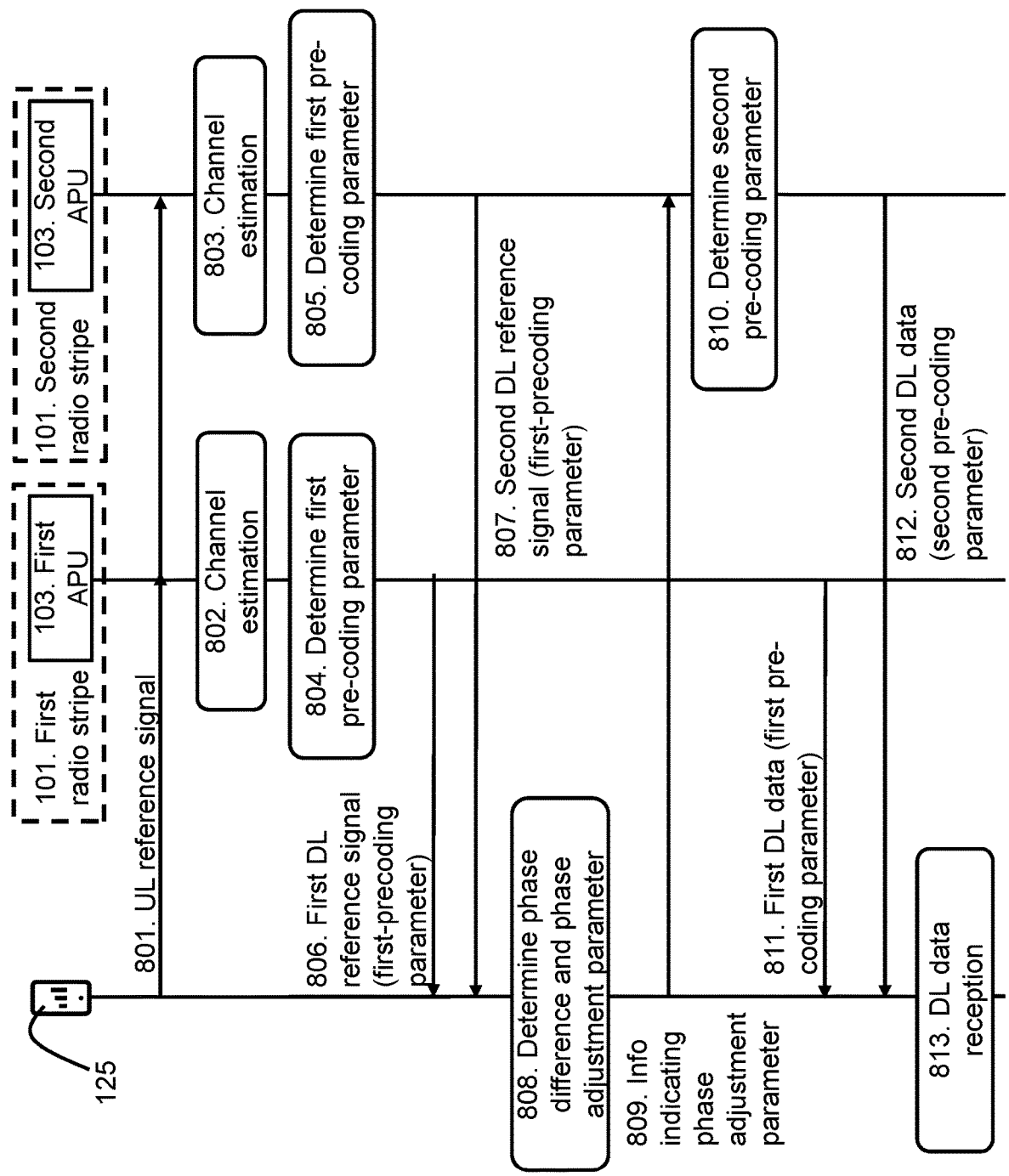
FIG. 8 is a signaling diagram illustrating a method.
Figure 9:
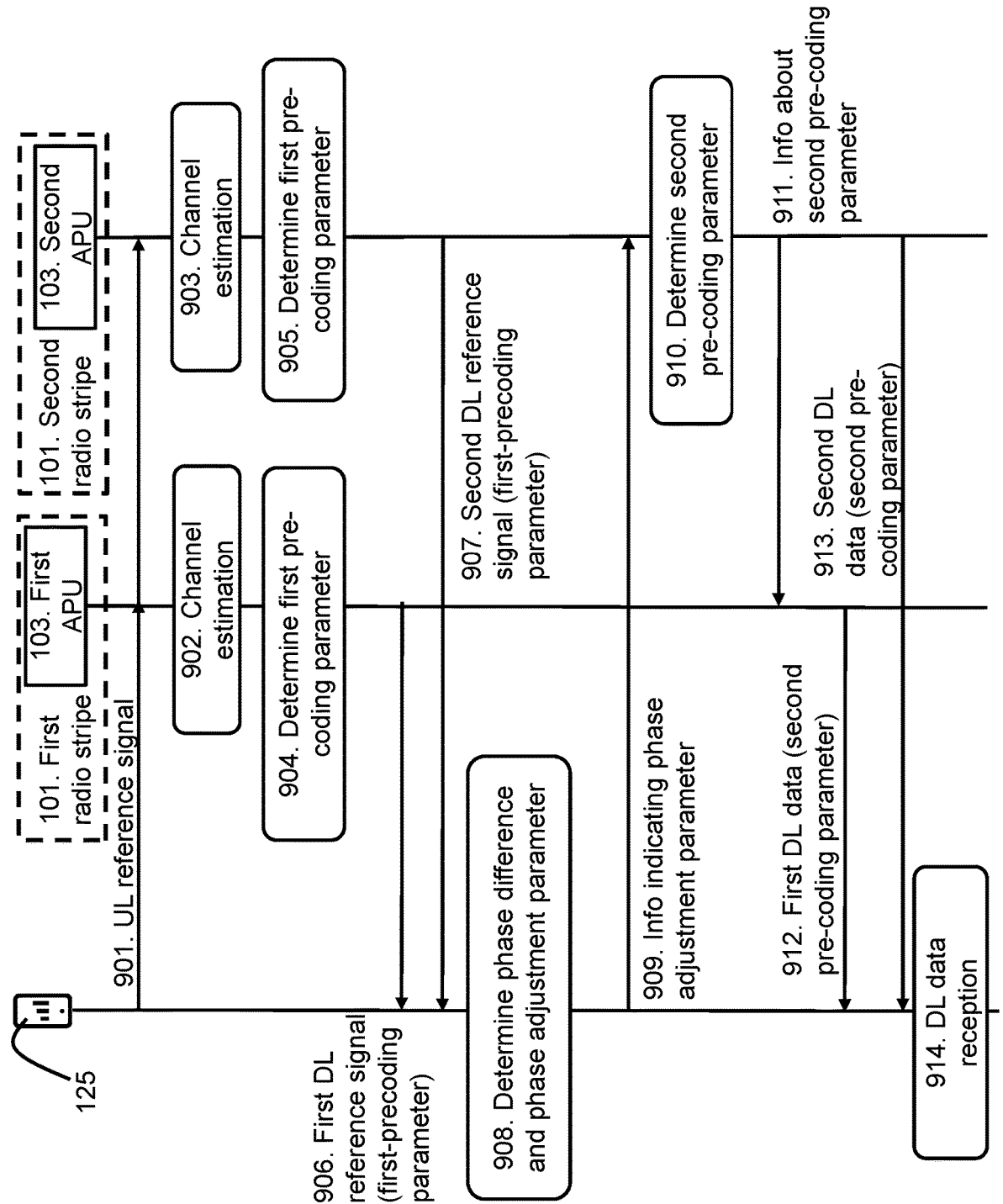
FIG. 9 is a signaling diagram illustrating a method.

This step corresponds to step 801 in FIGS. 8 and 901 in FIG. 9.

The UE 125 may transmit a UL reference signal to each APU 103 in each radio stripe 101 in the system 100. The UL reference signal may be referred to as a UL reference, an UL pilot signal, an UL pilot, an UL pilot transmission, a first reference signal, a first pilot signal etc. A signal may also be referred to as a symbol.

A reference signal, UL or DL, may be described as any a-priori known sequence that is transmitted for the purpose of obtaining knowledge of the channel.

The UL reference signal may be statically or dynamically configured. Static may be performed by higher layers. When the UE 125 attaches to the communication system 100 it will be configured by the Radio Resource Control (RRC) protocol and then it will receive information about what UL reference signal to transmit. Dynamic configuration may be performed by physical layer control signalling, e.g. the UE 125 may receive an index describing a reference signal on a physical downlink control channel. The UL reference signal may be configured using a combination of dynamic and static configuration, referred to as semi-static configuration. The semi-static configuration may be that the set of possible reference signal sequences may be configured statically by higher layers and the actual sequence within the set may be configured dynamically by lower layers.

Each APU 103 in each radio stripe 101 receives the UL reference signal from the UE 125.

The UL reference signal may be transmitted specifically to each APU 103 or it may be broadcasted.

If the system 100 comprises a first radio stripe 101 with a first APU 103 and a second radio stripe 101 with a second APU 103, then the UE 125 may transmit the UL reference signal to the first APU 103 and to the second APU 103.

The same UL reference signal may be sent to each APU 103 in each radio stripe 101.

Steps 702-703

These steps correspond to steps 802-803 in FIG. 8 and steps 902-903 in FIG. 9.

Each APU 103 in each radio stripe 101 may perform channel estimation based on the received UL reference signal in step 701. Using other words, each APU 103 in each radio strip1 101 may determine Channel State Information (CSI) based on the received UL reference signal in step 701. The CSI may be any information related to the channel, e.g. numerical value of channel coefficients, Doppler spread, Doppler shift, angular spread, delay spread, time- and frequency correlation, path-loss, etc.

If the system 100 comprises a first radio stripe 101 with a first APU 103 and a second radio stripe 101 with a second APU 103, then the first APU 103 may perform channel estimation based on the UL reference signal (step 702) and the second APU 103 may perform channel estimation based on the UL reference signal (step 703).

Steps 704-705

These steps correspond to steps 804-805 in FIG. 8 and steps 904-905 in FIG. 9.

Each APU 103 in each radio stripe 101 determines a respective first pre-coding configuration and a DL reference signal. Each APU 103 in each radio stripe 101 may determine an intra group beam-forming related configuration, i.e. the first pre-coding configuration may be referred to as an intra group beam-forming related configuration, a first beamforming weight, a first pre-coding weight, a first pre-coding parameter, a first pre-coding vector, a first pre-coding matrix.

The DL reference signal may be a pre-determined signal that does not depend on any pre-coding configuration. Before the DL reference signal is transmitted, a pre-coding configuration over the antennas is applied. So the UE 125 sees the combination "DL reference signal and pre-coding configuration". Normally, when referring to a "DL reference signal" the pre-coding configuration is not included. But some pre-coding configuration over the antenna elements may be necessary to transmit the signal from multiple elements.

The first pre-coding configuration may be described as one or multiple parameters, e.g. in the form of a vector, with numerical scaling values which may be used to adjust the phase and amplitude of each signal component for each APU 103.

Each APU 103 may determine its own first pre-coding configuration, and the determination may be based on measurements performed on the UL reference signal. The first pre-coding configurations may be different for each APU 103 since the UL channels from the UE 125 to the APUs 103 are different. The DL reference signals transmitted from each APUs 103 may also be different, and they may be configured e.g. dynamically, statically, or semi-statically.

Figure 7:
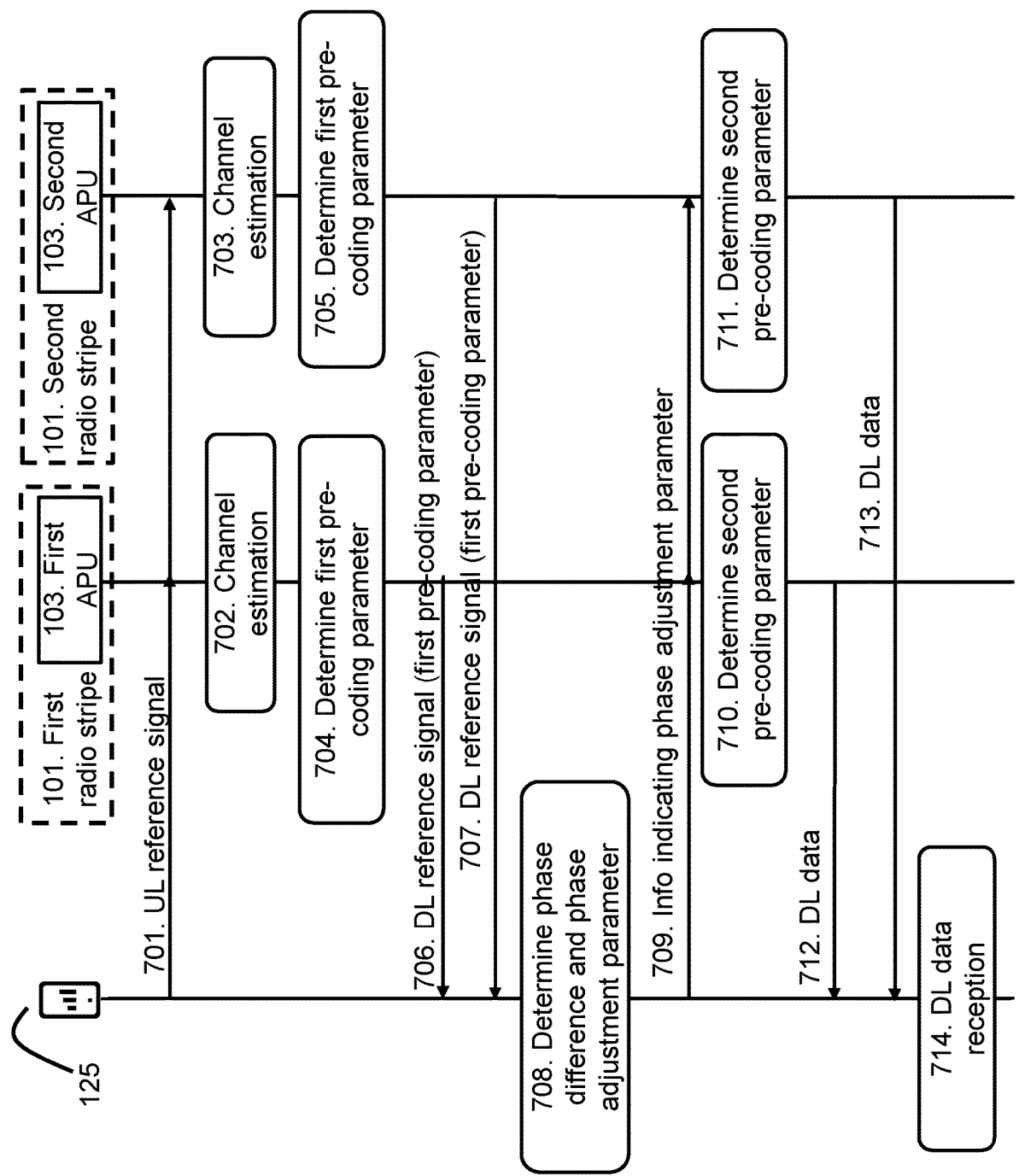
FIG. 7 is a signaling diagram illustrating a method.

The first pre-coding configuration may be determined based on the channel estimation in steps 702-703 for FIG. 7, steps 802-803 for FIG. 8 and steps 902-903 for FIG. 9. The first pre-coding configuration may be determined by selecting a first pre-coding configuration from a plurality of candidate first pre-coding configurations, e.g. comprised in a code book. The selection may be a random selection of the first pre-coding configuration or selection of a first pre-coding configuration in the plurality of candidate first-precoding configurations. A code book may also be referred to as a code-book or a codebook.

The DL reference signal may be referred to as a DL reference, a DL pilot signal, a DL pilot, a DL pilot transmission, a second reference signal, a second pilot signal etc. A signal may also be referred to as a symbol.

If the system 100 comprises a first radio stripe 101 with a first APU 103 and a second radio stripe 101 with a second APU 103, then the first APU 103 determines the first pre-coding configuration and a first DL reference signal (step 704), and the second APU 103 also determines the first pre-coding configuration and a second DL reference signal (step 705). As mentioned above, the first pre-coding configurations determined by the APUS 103 may be different. The first DL reference signal may be different from the second DL reference signal, or they may be at least substantially the same.

Steps 706-707

These steps correspond to steps 806-807 in FIG. 8 and steps 906-907 in FIG. 9.

Each APU 103 in each radio stripe applies the first pre-coding configuration to the DL reference signal. Each APU 103 in each radio stripe 101 sends, to the UE 125, the DL reference signal determined in steps 704-705 with the first pre-coding configuration. This may also be referred to as sending the DL reference signal applying the first pre-coding configuration.

The UE 125 receives the DL reference signal with the first pre-coding configuration from each of the APUs 103 in the system 100.

If the system 100 comprises a first radio stripe 101 with a first APU 103 and a second radio stripe 101 with a second APU 103, the first APU 103 may transmit a first DL reference signal to the UE 125 (step 706) and the second APU 103 may transmit a second DL reference signal to the UE 125 (step 707). Similarly, the UE 125 may receive a first DL reference signal from the first APU 103 (step 706) and a second DL reference signal from the second APU 103 (step 707).

Step 708

This step corresponds to step 808 in FIG. 8 and step 908 in FIG. 9.

The UE 125 determines a phase difference between the received DL reference signals, e.g. the phase difference between the first DL reference signal and the second DL reference signal or the phase difference between the received DL reference signals and a predetermined DL reference signal. The UE 125 determines at least one phase adjustment parameter based on the phase difference. The phase adjustment parameter may be the same as the phase difference, it may be different from the phase difference or it may be at least substantially the same as the phase difference.

Knowledge of the exact phase difference may be only located in the UE 125. To transmit this knowledge to the APUs 103, the information needs to be compressed. The compression may be performed by using a common code book comprising a set of phase adjustment parameters. Then the UE 125 selects a code word in the code book that has the closest match to the measured exact phase difference. The UE 125 then transmits an index to that code book back to the APU 103. The phase adjustment performed by the APU 103 may be based on the code book and not directly based on the UE measurement.

This step may also be referred to as the UE 125 determines an inter-group pre-coding configuration. The inter-group pre-configuration parameters may comprise the phase difference and/or the phase adjustment parameter. The inter-group pre-coding configuration may comprise e.g. a Pre-coding Matrix Index (PMI).

When determining the phase adjustment parameter, the UE 125 may use one of the received DL reference signals a basis, and then the other DL reference signals are compared to this basis signal. The UE 125 may compare the DL reference signal from e.g. the first APU 103 with the DL reference signal from the second APU 103 in order to find a phase difference between these DL reference signals. It may be the phases of the DL reference signals that are compared to each other.

Step 709

This step corresponds to 809 in FIG. 8 and step 909 in FIG. 9.

The UE 125 transmits information indicating the at least one phase adjustment parameter to at least one APU 103 in the plurality of APUs 103 in the system 100. The UE 125 may transmit the information to one APU 103, to more than one APU 103 or to all APUs 103 in the plurality. Step 709 in FIG. 7 shows that the information may be transmitted to all APUs 103, step 809 in FIG. 8 and step 909 in FIG. 9 shows that the information may be transmitted to one APU 103, e.g. the second APU 103.

At least one APU 103 receives the information indicating the at least one phase adjustment parameter from the UE 125. Step 709 in FIG. 7 shows that all APUs 103 may receive the information, and step 809 in FIG. 8 and step 909 in FIG. 9 shows that one APU 103 may receive the information, e.g. the second APU 103.

This may also be seen as the UE 125 providing feedback to the APUs 103 regarding the DL references signals that they sent in steps 706-707 in FIG. 7, steps 806-807 in FIG. 8 and steps 906-907 in FIG. 9. The information may be in the form of a PMI. At least one APU 103 receives the UE feedback.

In this step and before the transmission is performed, the UE 125 may determine which of the APUs 103 that the information should be transmitted to. As mentioned under step 708, the UE 125 may use one of the DL reference signal as a basis to which the other DL reference signals are compared. The UE 125 may determine that the APU 103 which transmitted the DL reference signal used as a basis should not receive the information indicating the at least one phase adjustment parameter. In other words, the APUs 103 which has transmitted DL reference signals which has been compared with the basis signal should receive the information indicating the at least one phase adjustment parameter. For example, the information indicating the at least one phase adjustment parameter may be transmitted to the second APU 103, and not to the first APU 103 when the first APU 103 was used as the basis, which is illustrated in step 809 in FIG. 8 and step 909 in FIG. 9.

The information indicating the at least one phase adjustment parameter may be the actual phase adjustment parameter or a reference or index reference to a code book comprising candidate phase adjustment parameters.

Steps 710-711

These steps correspond to step 810 in FIG. 8 and step 910 in FIG. 9.

After having received the information indicating the phase adjustment parameter, at least one of the APUs 103 in the system 100 determines a second pre-coding configuration. The second pre-coding configuration is determined based on the first pre-coding configuration and adjusted with the phase adjustment parameter.

If there is an APU 103 that does not receive the information indicating the at least one phase adjustment parameter, then this APU 103 may not necessarily determine the second pre-coding configuration. It may be only the APU 103 that has received the information indicating the at least one phase adjustment parameter that may determine the second pre-coding configuration, which is illustrated in step 810 in FIG. 8.

One APU 103 may determine the second pre-coding configuration and provide it to the other APUs 103 in the system 100, which is illustrated in steps 910-911 in FIG. 9.

These steps 710-711 may be described as adjusting beamforming based on the UE feedback, i.e. the feedback from step 709.

The second pre-coding configuration may be referred to as a second beamforming weight or a second pre-coding weight, a second pre-coding parameter, a second pre-coding vector and as a second pre-coding matrix.

The second pre-coding configuration may be described as one or multiple parameters, e.g. in the form of a vector, with numerical scaling values.

Each APU 103 may determine its own second pre-coding configuration. The second pre-coding configurations may be different for each APU 103.

Steps 712-713

These steps correspond to steps 811-812 in FIG. 8 and steps 912-913 in FIG. 9.

Each APU 103 in the system 100 applies a pre-coding configuration to DL data, and transmits the DL data to the UE 125. Applying the pre-coding configuration may also be referred to as pre-coding with the pre-coding configuration. For the APU 103 which determined the second pre-coding configuration, it transmits DL data which is pre-coded with the second pre-coding configuration. If there is one or more APUs 103 that has not determine any second pre-coding configuration, then this APU 103 transmits DL data which is pre-coded with the first pre-coding configuration.

If the system 100 comprises a first radio stripe 101 with a first APU 103 and a second radio stripe 101 with a second APU 103, and only the second APU 103 determined the second pre-coding configuration, then the second APU 103 transmits second DL data pre-coded with the second pre-coding configuration, and the first APU 103 transmits first DL data pre-coded with the first pre-coding configuration, as seen in steps 811-812 in FIG. 8.

If the system 100 comprises a first radio stripe 101 with a first APU 103 and a second radio stripe 101 with a second APU 103, and both the first APU 103 and the second APU 103 determined the second pre-coding configuration, then the first APU 103 transmits first DL data pre-coded with the second pre-coding configuration and the second APU 103 transmits second DL data pre-coded with the second pre-coding configuration, as seen in steps 712-713 in FIG. 7 and steps 912-913 in FIG. 9.

Step 714

This step corresponds to step 813 in FIG. 8 and step 914 in FIG. 9.

The UE 125 receives the data from the APUs 103 in the system 100. The received data is at least partly phase coherent since at least some of the received data is pre-coded with the second pre-coding configuration, and since the second pre-coding configuration has been determined based on the first pre-coding configuration and adjusted with the phase adjustment parameter.

The method illustrated in FIGS. 7, 8 and 9 that achieve global phase coherent transmission may be summarized as follows:

Step a: This step corresponds to steps 701-703 in FIG. 7, steps 801-803 in FIG. 8 and steps 901-903 in FIG. 9 Send UL reference signal from the UE 125. In FIGS. 7, 8 and 9, only one UE 125 is depicted, e.g. the desired UE 125 mentioned earlier, but this step may be performed by all active UEs 125 in the system 100. Based on UL transmission of the UL reference signal from each UE 125, the APU 103 may obtain Channel State Information (CSI) to be used for calculation of proper beamforming weights.

Step b: This step corresponds to steps 706-707 in FIG. 7, steps 806-807 in FIG. 8 and steps 906-907 in FIG. 9. The APUs 103 utilize channel reciprocity to calculate a first set of DL transmission pre-coding weights, i.e. the first pre-coding configuration mentioned above. Use the first pre-coding weights to beamform at least two DL reference signals from at least two different groups of non-co-located radio stripes 101.

Step c: This step corresponds to steps 708-709 in FIG. 7, steps 808-809 in FIG. 8 and steps 908-909 in FIG. 9. The UE 125 measures the received phase difference and reports a desired phase adjustment to at least one APU 103. The reporting may be compressed by utilizing a common code book such that the UE 125 feedbacks only an index value. The code book may be dynamic and may be different from one instance to another. A coarse code book may be used to first send a large phase correction feedback and a more detailed code book may be used to track a smaller phase offset after an initial large adjustment. The code book may be a 3GPP code book.

Step d: This step corresponds to steps 710-714 in FIG. 7, steps 810-813 in FIG. 8 and steps 910-914 in FIG. 9. At least one of the APUs 103 in the system 100 determines a second set of DL transmission pre-coding weights, i.e. the second pre-coding configuration mentioned above, based on the feedback and transmit data to the UE 125 accordingly.

The UE 125 may send information indicating multiple phase adjustment parameters, e.g. multiple PMI values. The multiple phase adjustment parameters may be e.g. one per group of APUs 103. An APU group may correspond to a radio stripe 101. When there are N APU groups it may be enough for the UE 125 to determine and send back N−1 PMI values since the absolute received phase of the first APU group is irrelevant, where N is a positive integer. The phase adjustment parameters for the remaining APU groups may be selected to match the phase of the first APU group.

The UE 125 and the APU 103 may have agreed on a code book comprising phase adjustment parameters for multiple APU groups, and in that case the UE 125 may determine and sends back only a single phase adjustment parameter. Such a code book may be defined in a standard, e.g. 3GPP.

The code book used for phase adjustment may be hierarchical. E.g. a first a set of coarse phase adjustments, e.g. one phase adjustment per APU group, may be determined based on a coarse code book and the corresponding phase adjustment parameter(s) are sent back to the APU 103 in a first step. In a later step, a finer granularity code book may be used to track smaller phase errors.

Figure 10:
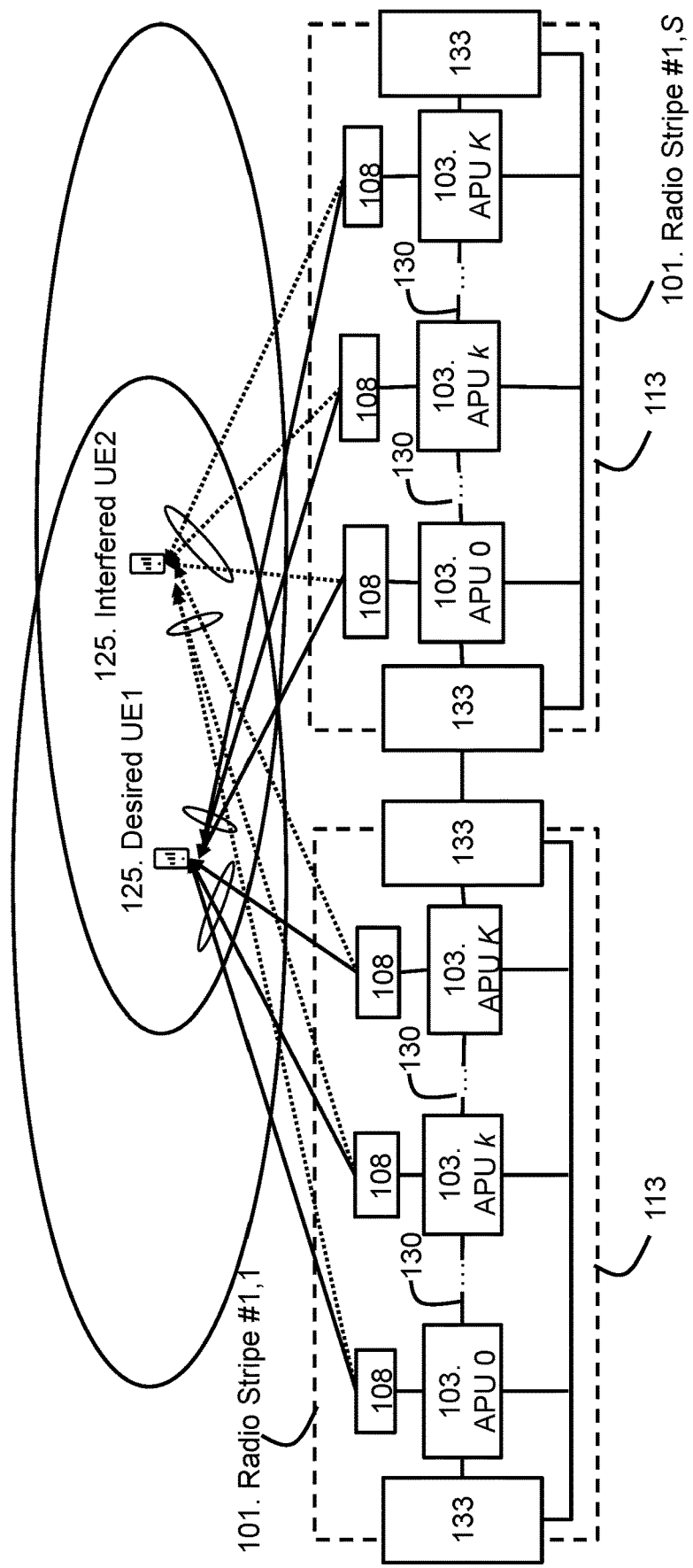
FIG. 10 is a schematic diagram illustrating a distributed massive MIMO communication system with transmissions with local phase coherence from multiple groups of adjacent and co-located radio stripes.

FIG. 10 shows two radio stripes 101 transmitting to the same UE 125, e.g. UE1, while minimizing the interference to one or more other UEs 125, e.g. UE2. In other words, FIG. shows transmission with local phase coherence from multiple groups of adjacent and co-located radio stripes 101. Note that the signal components arriving at UE1 125 may be divided into two groups that are internally phase coherent but not phase aligned with each other. By providing the UE 125 with additional reference signals or pilot signals corresponding to the two groups, the UE 125 may observe the phase difference of the reference signals and send a feedback message back to the APU 103 informing the APU 125 about how to adjust the transmitted phases such that the signal components add up coherently at the desired UE 125. The circles around the solid arrows between the APUs 103 and the desired UE 125, e.g. UE1, may represent feedback based coherent addition of "signal" from different radio stripes. The dotted arrows between the APUs 103 and the interfered UE 125, e.g. UE 2, represent non-coherent addition of "zeros" from different radio stripes 101.

Figure 11:
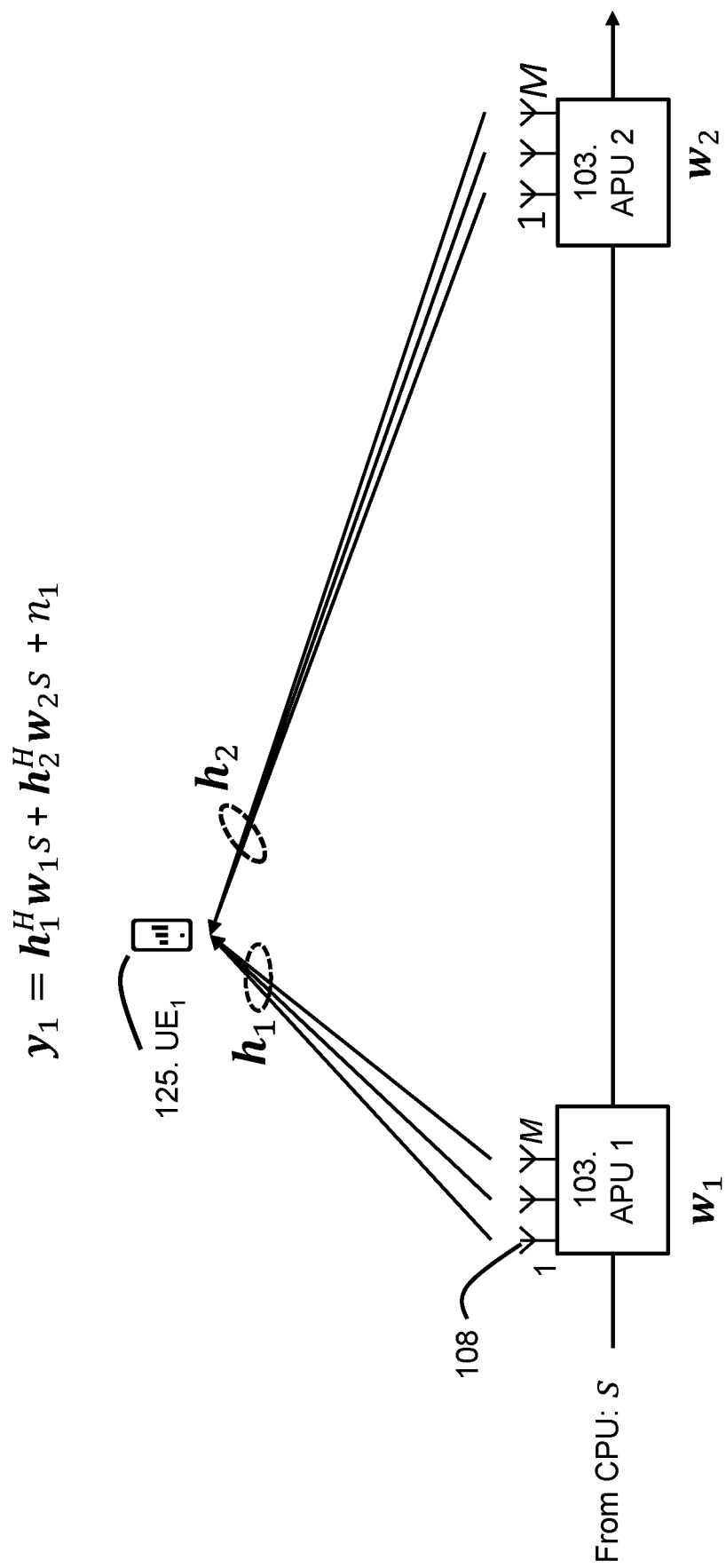
FIG. 11 is a schematic diagram illustrating transmission of signal s from two groups of co-located APUs (APU1 and APU2) to the desired UE1.

Note that this only works for the desired UE, e.g. UE1 in FIG. 11. The interfered UE 125, e.g. UE2, is receiving another transmission involving both radio stripes 101 (not shown in FIG. 10) and cannot reliably measure on the weak interference signal components. Also, ideally these signal components shall be close to zero in case the interference suppressing beamforming algorithm has been successful. A phase adjustment controlled by the desired UE 125, e.g. UE1, will therefore provide a large gain for the desired UE 125 while not significantly affecting the interference power received by non-desired UEs 125, e.g. UE2. A more thorough analysis of the signal and interference components is provided below.

The signal and interference components will now be described in more detail with reference to FIGS. 11, 12 and 13. Consider a setup where two APUs 103 are jointly transmitting to a single-antenna UE 125, called UE1, while limiting the interference caused to another single-antenna UE 125, called UE2. Each of the two APUs 103, called APU1 and APU2, are controlling the signals emitted from N different antennas, where N is a positive integer. A single-antenna UE is an UE 125 with one antenna element 108.

FIG. 11 shows transmission of signal s from two groups of co-located APUs, i.e. APU1 and APU2, to the desired UE1 125. FIG. 12 shows the signal gain achieved by joint transmission from two APUs 103 when there is phase difference. FIG. 13 shows the interference generated at an "un-desired UE 125", e.g. UE2, when transmitting the symbol s to a desired UE 125, e.g. UE1.

Desired Signal Gain

The information signal s may be jointly transmitted from the CPU 105 via APU1 and APU2 to UE1 125. The received signal $y_1$ at UE1 125 may be:

$$y_1 = H_1^H w_1 s + h_2^H w_2 s + n_1$$

where $n_1$ is the receiver noise experienced by the UE 125, $h_1 \in \mathbb{C}^N$ is the channel vector from the antenna elements 108 connected to APU1 103, and $h_2 \in \mathbb{C}^N$ is the channel vector from the antenna elements 108 connected to APU2 103, N is a positive integer, see FIG. 11. The APU1 103 and the APU2 103 shown in FIG. 11 each has M number of antenna elements 108.

The information signal s in the equation above is a data symbol transmitted to the UE 125. It originates in the CPU 105 and is sent on the fronthaul cable to all APUs 103, e.g. APU1 and APU2. Then the APU 103 applies the pre-coders w1 and w2 and sends the signal over the channels h1 and h2 respectively to the UE 125 that receives the signal y1 as described by the equation.

The pre-coding vectors used by APU1 103 are $w_1 \in \mathbb{C}^N$ and the pre-coding vectors used by APU2 103 are $w_2 \in \mathbb{C}^N$. The signal gain at UE1 125 is $|h_1^H w_1 + h_2^H w_2|^2$. To achieve coherent combination of the signal components $h_1^H w_1$ and $h_2^H w_2$, it may be desirable to select the phases of the pre-coding vectors such that $\arg(h_1^H w_1) = \arg(h_2^H w_2)$. This may be achieved by many pre-coding configurations, including maximum ratio transmission, but require that the APUs 103 have a common phase reference to be perfectly implemented.

Suppose that the two APUs 103 do not have a common phase reference. This may be described by a coefficient θ that describes the phase difference between the APUs 103, in which case the actual received signal is $$y_1 = h_1^H w_1 s + e^{j\theta} h_2^H w_2 s + n_1$$

where j denotes the imaginary number. The signal gain is $|h_1^H w_1 + e^{j\theta} h_2^H w_2|^2$. Suppose any pre-coding scheme that makes $\arg(h_1^H w_1) = \arg(h_2^H w_2)$ may be used, in this case $$|h_1^H w_1 + e^{j\theta} h_2^H w_2|^2 = |h_1^H w_1 + \cos(\theta) h_2^H w_2 + j\sin(\theta) h_2^H w_2|^2 = |h_1^H w_1|^2 + 2\cos(\theta)|h_1^H w_1||h_2^H w_2| + |h_2^H w_2|^2.$$

The second term depends on θ and is a decreasing function for $\theta \in [0, \pi]$. If the phase difference is guaranteed to be smaller than π/2 rad=90 degrees, then $\cos(\theta) \geq 0$ and a lower bound on the signal gain may be achieved as $$|h_1^H w_1 + e^{j\theta} h_2^H w_2|^2 \geq |h_1^H w_1|^2 + |h_2^H w_2|^2$$

by setting $2\cos(\theta)|h_1^H w_1||h_2^H w_2| = 0$. In this case, there is no constructive combination of the signals from the two APUs 103, but the signal gain is still higher than in the case of only transmitting from one of the APUs 103. For example, if $h_1^H w_1 = h_2^H w_2 = a$, then θ=0 gives the signal gain $4a^2$, while θ=π/2 gives $2a^2$.

Destructive combination of the signal components occurs for $\theta \in (\pi/2, \pi]$. The worst case may appear when θ approaches π (180 degrees), when $$|h_1^H w_1 + e^{j\theta} h_2^H w_2|^2 \to |h_1^H w_1|^2 - 2|h_1^H w_1||h_2^H w_2| + |h_2^H w_2|^2 = ||h_1^H w_1| - |h_2^H w_2||^2.$$

If $h_1^H w_1 = h_2^H w_2$, then the signal components may cancel entirely in the worst case.

Figure 12:
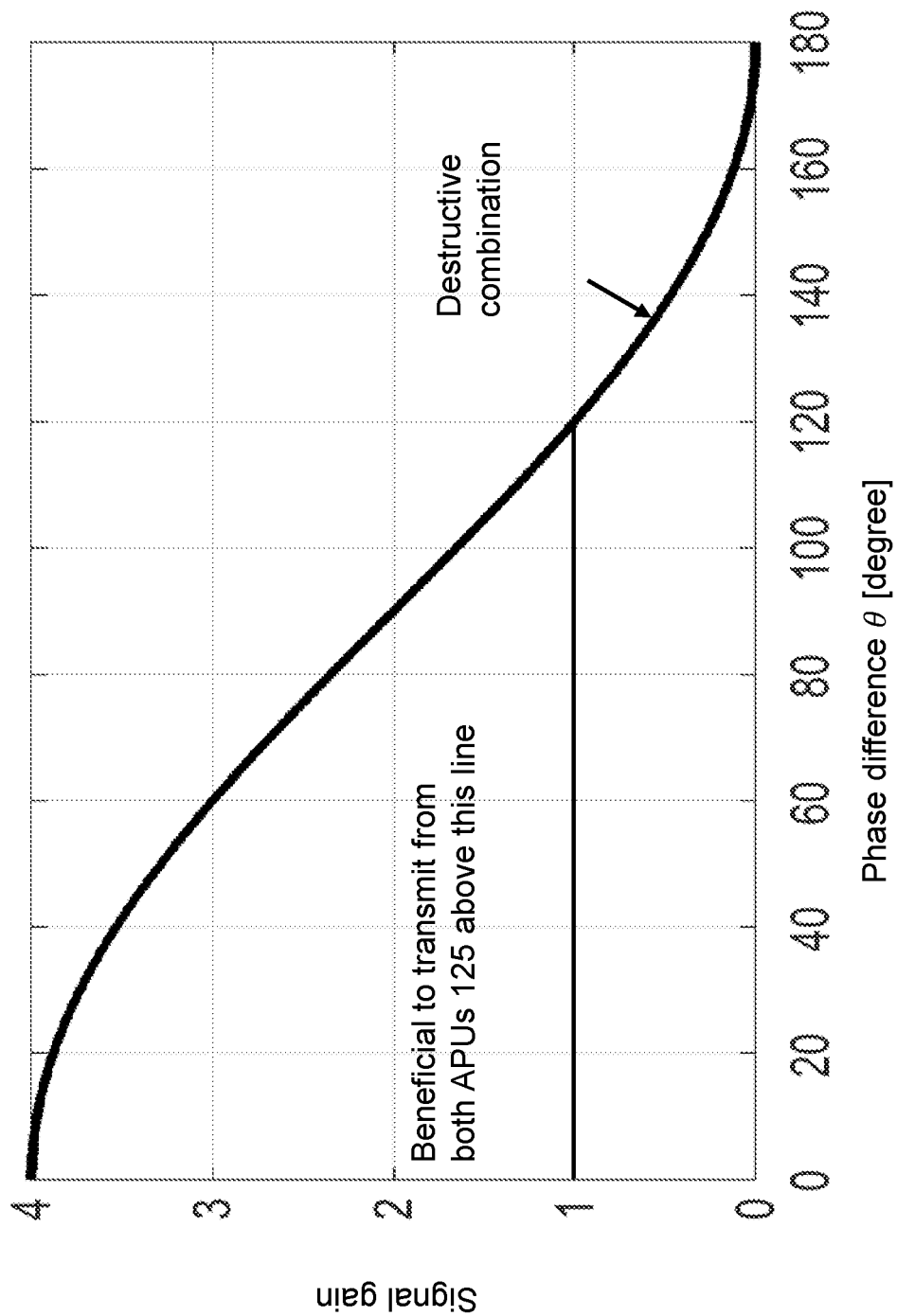
FIG. 12 is a graph illustrating signal gain achieved by joint transmission from two APUs when there is phase difference.

The impact of the phase difference is illustrated in FIG. 12 using $h_1^H w_1 = h_2^H w_2 = a = 1$. The x-axis of FIG. 12 represents the phase difference θ measured in degrees, and the y-axis of FIG. 12 represents the signal gain. If only one APU 103 would transmit to UE1 125, the signal gain would be 1. FIG. 12 shows that it is beneficial to transmit from both APUs 103 up until the point of θ=120 degrees, which is a very large phase difference. Even at θ=90, the loss in signal gain is only 3 dB compared to the maximum, and the signal gain is 3 dB higher than in the case of using only one APU 103. Hence, even if the signal gain reduces when there is a phase difference, the benefit of coherent transmission remains in most practical cases.

Interference Gain

Figure 13:
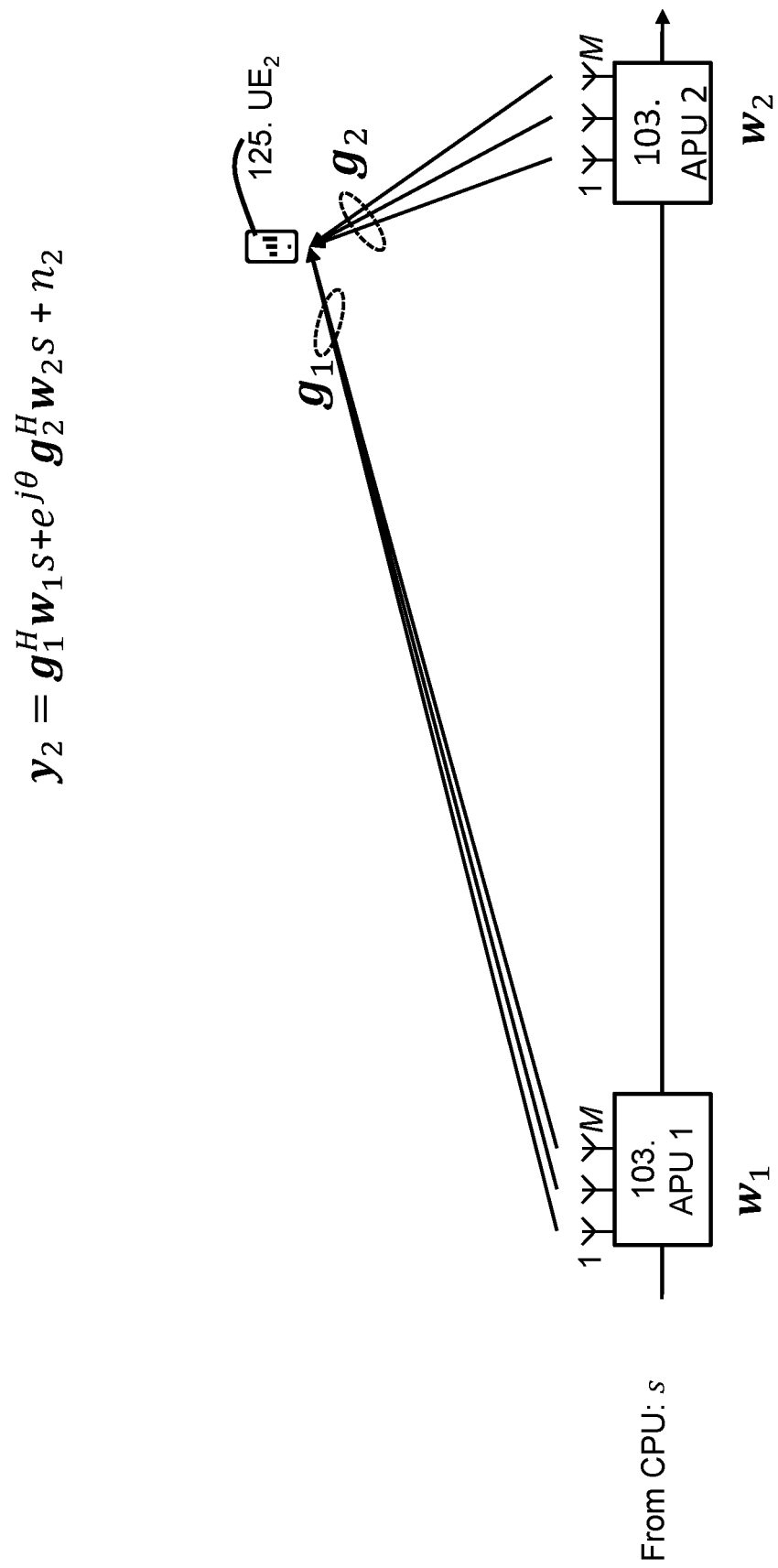
FIG. 13 is a schematic diagram illustrating interference generated at an "un-desired UE" (UE2) when transmitting symbol s to a desired UE1, shown in FIG. 11.

With the same system modeling as above, the interference that is caused to the undesired receiver UE2 125 may be shown to behave in a similar way. Let the received signal be $$y_2 = g_1^H w_1 s + e^{j\theta} g_2^H w_2 s + d + n_2$$

where d is a desired signal transmitted from some other location, $n_2$ is noise, $g_1 \in \mathbb{C}^N$ is the channel vector from the antennas connected to APU1 103, and $g_2 \in \mathbb{C}^N$ is the channel vector from the antennas connected to APU2 103, see FIG. 13.

The interference power may be $$|g_1^H w_1 + e^{j\theta} g_2^H w_2|^2$$

that is caused to UE2 125. Its value depends on θ but it may be bounded as $$||g_1^H w_1| - |g_2^H w_2||^2 \leq |g_1^H w_1 + e^{j\theta} g_2^H w_2|^2 \leq ||g_1^H w_1| + |g_2^H w_2||^2$$

where the lower bound is achieved when the signal components have opposite phases: $\arg(g_1^H w_1) = -\arg(e^{j\theta} g_2^H w_2)$. The upper bound is achieved when the signal components have the same phase: $\arg(g_1^H w_1) = \arg(e^{j\theta} g_2^H w_2)$.

Suppose $|g_1^H w_1| = |g_2^H w_2| = b$, then in the worst case, the interference gain may be $4b^2$. Hence, as compared to a case where only one APU 103 is transmitting, the interference gain may at most increase by 6 dB, from $b^2$ to $4b^2$.

If a Zero Forcing (ZF) pre-coding scheme is selected such that $g_1^H w_1 = b$ and $g_2^H w_2 = -b$, for some $b \in \mathbb{C}$, then the interference gain may be $g_1^H w_1 + g_2^H w_2 = 0$ if θ=0. When there is a phase difference, the following is obtained instead:

$$|g_1^H w_1 + e^{j\theta} g_2^H w_2|^2 = |b - e_{j\theta} b|^2 = 2|b|^2 (1 - \cos(\theta))$$

which is proportional to $|b|^2$ and may quickly become large if $|b|$ is large. b may be described as a relative parameter that may be adjusted to reduce the interference sensitivity. If two values of b are compared the larger one is more sensitive to interference caused by phase errors.

This interference sensitivity issue may be addressed by selecting the pre-coding configuration such that $|b|^2$ is small; that is, the interference contribution from each APU 103 should be small. The best case may be to select the "local" ZF vector $$w_1 = [h_1 \ g_1]([h_1 \ g_1]^H [h_1 \ g_1])^{-1} \begin{bmatrix} 1 \\ 0 \end{bmatrix}$$

at APU1 103, which makes $h_1^H w_1 = 1$ and $g_1^H w_1 = 0$. This pre-coding vector may be scaled to meet the power constraints of APU1 103, while keeping b=0. A small interference contribution is close to 0. An interference level is compared with a level of the desired signal and if this difference is large (i.e. the signal-to-interference ratio is large) then the interference is small. Similarly, APU2 103 may select $$w_2 = [h_2 \ g_2]([h_2 \ g_2]^H[h_2 \ g_2])^{-1}\begin{bmatrix}1\\0\end{bmatrix}$$

which makes $h_2^H w_2=1$ and $g_2^H w_2=0$. Note that these pre-coding methods may be if N≥2.

It should be noted that the 6 dB interference increase mentioned above may be an absolute worst case and in most cases the interference increase may be smaller. In case many local ZF pre-coders are used, e.g. one ZF pre-coding per phase coherent APU group, then all interference components may theoretically be zero. Phase shifting a set of zero-valued interference signal components may have no impact at all on the sum interference.

There is a variety of other pre-coding schemes that may achieve small values of $|g_1^H w_1|$ and $|g_2^H w_2|$, making the system 100 robust to interference. Local ZF based on imperfect channel state information may be one option. Signal-to-interference-and-leakage beamforming may be another option.

Figure 14:
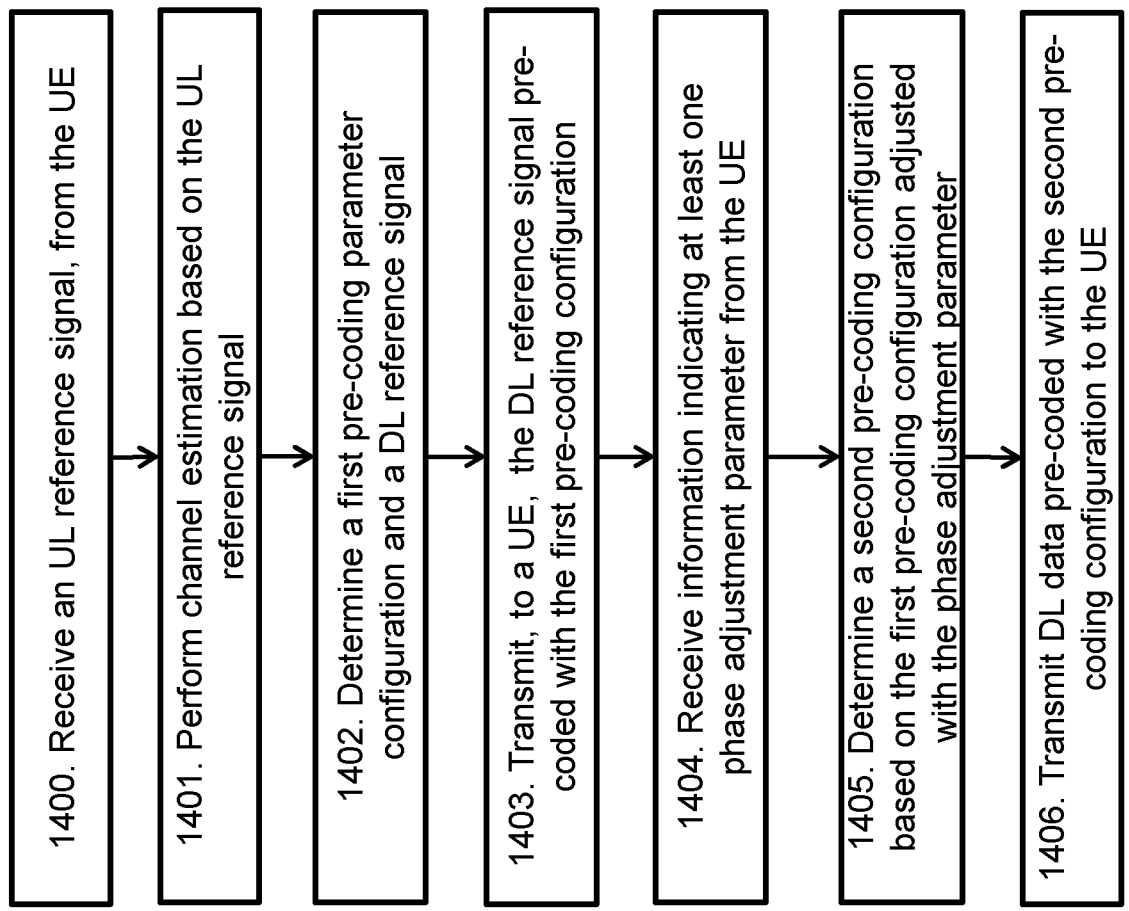
FIG. 14 is a flow chart illustrating a method performed by an APU.

The method described above will now be described seen from the perspective of the APU 103. FIG. 14 is a flowchart describing the present method performed by the APU 103 for handling data transmissions in a distributed massive MIMO communication system 100. Each of the at least two non-co-located groups of APUs 103 may be comprised in a respective radio stripe 101 or cable. The APU 103 and other APUs 103 in the group may be connected to a processing unit 108 through a fronthaul 110. When at least two groups of APUs are non-co-located they are separately located, they are located with some distance between them, they are located at different places etc. In other words, the at least two groups of APUs are not located jointly or together.

The method illustrated in FIG. 14 comprises at least one of the following steps to be performed by the APOU 103, which steps may be performed in any suitable order than described below:

Step 1400

This step corresponds to step 801 in FIG. 8. The APU 103 may receive an UL reference signal from the UE 125.

Step 1401

This step corresponds to step s 802-803 in FIG. 8 The APU 103 may perform channel estimation based on the UL reference signal.

Step 1402

This step corresponds to steps 804-805 in FIG. 8. The APU 103 determines a first pre-coding configuration and a DL reference signal. The first pre-coding configuration may be in the form of one or multiple first pre-coding parameters, a first pre-coding vector, a first pre-coding matrix, an intra group beam-forming related configuration, one or multiple first beamforming weights, one or multiple first pre-coding weights etc.

The first pre-coding configuration may be determined based on the channel estimation.

The first pre-coding parameter may be determined by selecting a first pre-coding parameter from a plurality of candidate first pre-coding configurations. The selection may be a random selection or a selection of the first pre-coding parameter in the plurality. A random selection may for example be done when there is a single antenna element per APU 103.

Step 1403

This step corresponds to steps 806, 807 in FIG. 8. The APU 103 transmits, to a UE 125, the DL reference signal pre-coded with the first pre-coding configuration. That the DL reference signal is pre-coded with the first pre-coding configuration may also be referred to as the first pre-coding configuration is applied to the DL reference signal.

Step 1404

This step corresponds to step 809 in FIG. 8. The APU 103 receives information indicating at least one phase adjustment parameter from the UE 125.

The APU 103 and the UE 125 may have previously agreed on a code book comprising one or more phase adjustment parameters.

The information indicating the at least one phase adjustment parameter may be to value of the phase adjustment parameter or a reference to a code book comprising one or more candidate phase adjustment parameters.

The code book may be a first code book or a second code book. The second codebook may be associated with a granularity that is different than the first codebook and associated with smaller phase differences than the first code book.

Step 1405

This step corresponds to steps 810, 811 in FIG. 8. The APU 103 determines a second pre-coding configuration based on the first pre-coding configuration adjusted with the phase adjustment parameter.

The second pre-coding configuration may be in the form of one or multiple second pre-coding parameters, a second pre-coding vector, a second pre-coding matrix, one or multiple second beamforming weights, one or multiple second pre-coding weights etc.

This step may be described as adjusting a phase for the DL data transmission based on the information indicating at least one phase adjustment parameter. The determining may comprise a phase adjustment of the first pre-coding configuration.

Step 1406

This step corresponds to steps 812-813 in FIG. 8. The APU 103 transmits DL data pre-coded with the second pre-coding configuration to the UE 125. Using other words, the transmitted DL data may be at least partly phase coherent based on the at least one phase adjustment parameter.

Figure 15:
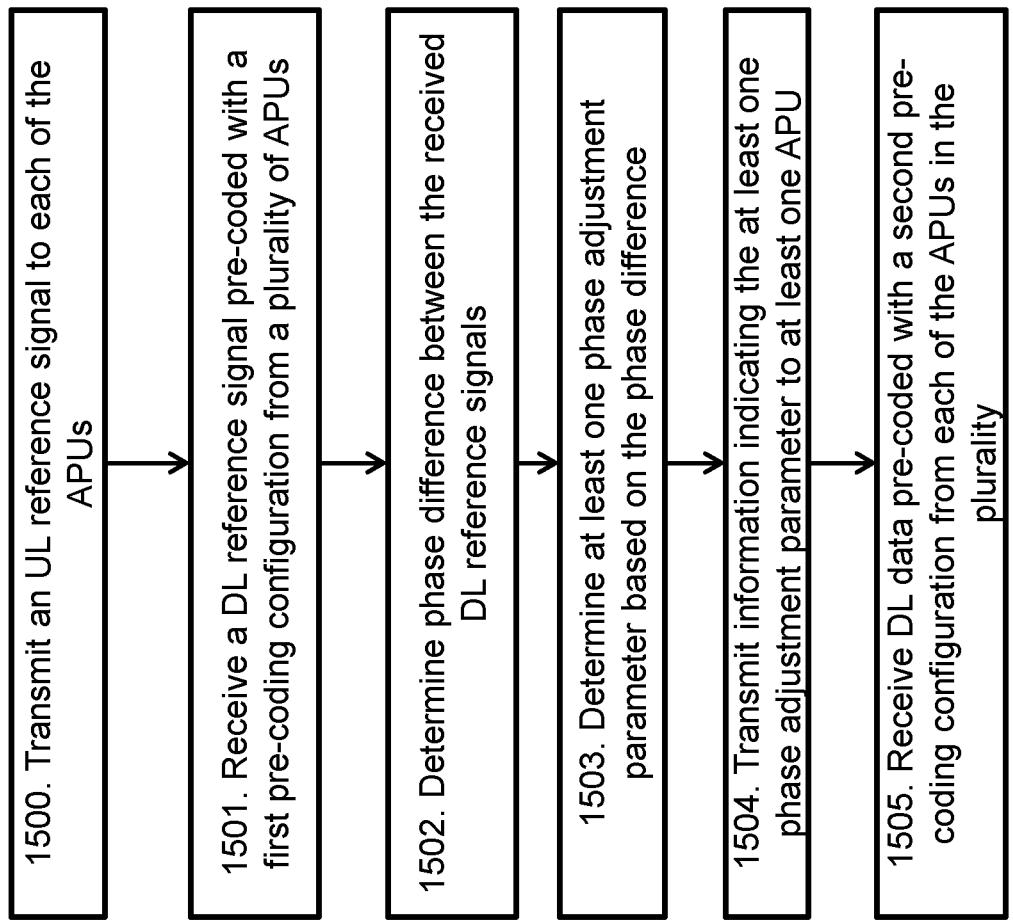
FIG. 15 is a flow chart illustrating a method performed by a UE.

The method described above will now be described seen from the perspective of the UE 125. FIG. 15 is a flowchart describing the present method performed by the UE 125 for handling data transmissions in a distributed massive MIMO communication system 100. The method illustrated in FIG. 15 comprises at least one of the following steps to be performed by the APOU 103, which steps may be performed in any suitable order than described below:

Step 1500

This step corresponds to step 701 in FIG. 7. The UE 125 may transmit an UL reference signal to each of the APUs in the plurality.

Step 1501

This step corresponds to steps 806-807 in FIG. 8. The UE 125 receives a DL reference signal pre-coded with a first pre-coding configuration from a plurality of APUs 103. The plurality of APUs 103 are comprised in at least two groups of non-co-located APUs 103 in the system 100, e.g. a first APU is comprised in a first group and a second APU is comprised in a second group.

Step 1502

This step corresponds to step 808 in FIG. 8. The UE 125 determines a phase difference between the received DL reference signals.

Step 1503

This step corresponds to step 808 in FIG. 8. The UE 125 determines at least one phase adjustment parameter based on the phase difference which was determined in step 1502.

N−1 phase adjustment parameters may be determined, where N is a number of groups of APUs 103. N is a positive integer.

One phase adjustment parameter may be determined when the UE 125 and each of the APUs 103 in the plurality may have previously agreed on a code book comprising one or more phase adjustment parameters Step 1504

This step corresponds to step 809 in FIG. 8. The UE 125 transmits information indicating the at least one phase adjustment parameter to at least one APU 103 in the plurality of APUs.

The information indicating the at least one phase adjustment parameter may be a value of the phase adjustment parameter or a reference to a code book comprising one or more phase adjustment parameters.

The code book may be a first code book or a second code book. The second codebook may be associated with a granularity that is different than the first codebook and may be associated with smaller phase differences than the first code book.

Step 1505

This step corresponds to steps 812-813 in FIG. 8. The UE 125 receives DL data pre-coded with a second pre-coding configuration from each of the APUs 103 in the plurality.

Figure 16:
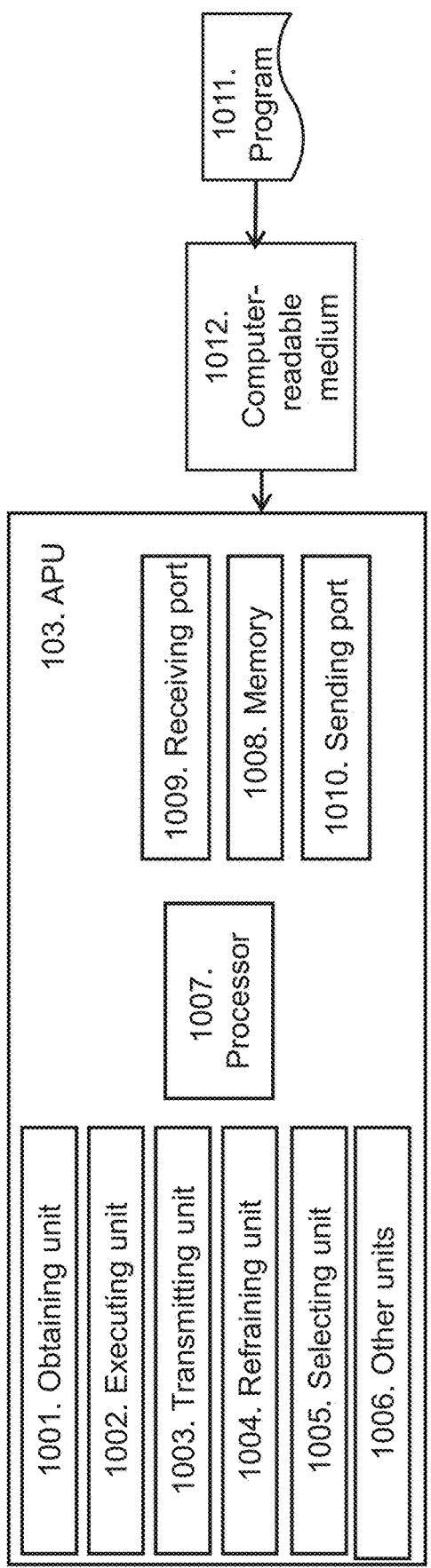
FIG. 16 is a schematic drawing illustrating an example of an APU.
Figure 17:
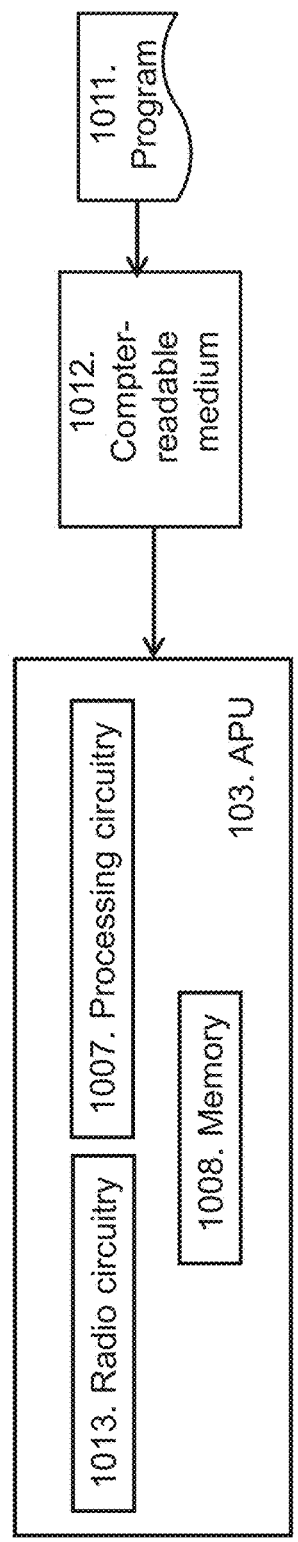
FIG. 17 is a schematic drawing illustrating an example of an APU.

To perform the method steps shown in FIGS. 7-9 and 14 for for handling data transmissions in a distributed massive MIMO communication system 100, the APU 103 comprises an arrangement as shown in FIG. 16 and FIG. 17. Each of the at least two non-co-located groups of APUs 103 may be comprised in a respective radio stripe 101 or cable. The APU 103 and other APUs 103 in the group may be connected to a processing unit 108 through a fronthaul 110.

The APU 103 is adapted to, e.g. by means of a determining unit 1001, determine a first pre-coding configuration and a DL reference signal. The first pre-coding configuration may be determined based on the channel estimation. The first pre-coding configuration may be determined by selecting a first pre-coding configuration from a plurality of candidate first pre-coding configurations.

The APU 103 is adapted to, e.g. by means of a transmitting unit 1003, transmit, to a UE 125, the DL reference signal pre-coded with the first pre-coding configuration.

The APU 103 is adapted to, e.g. by means of a receiving unit 1005, receiving information indicating at least one phase adjustment parameter from the UE 125. The APU 103 and the UE 125 may have previously agreed on a code book comprising one or more phase adjustment parameters. The information indicating the at least one phase adjustment parameter may be a value of the phase adjustment parameter or a reference to a code book comprising one or more candidate phase adjustment parameters. The code book may be a first code book or a second code book. The second codebook may be associated with a granularity that is different than the first codebook and associated with smaller phase differences than the first code book.

The APU 103 is adapted to, e.g. by means of the determining unit 1001, determine a second pre-coding configuration based on the first pre-coding configuration adjusted with the phase adjustment parameter.

The APU 103 is adapted to, e.g. by means of the transmitting unit 1003, transmit DL data pre-coded with the second pre-coding configuration to the UE 125.

The APU 103 may be adapted to, e.g. by means of the receiving unit 1005, receive an UL reference signal from the UE 125.

The APU 103 may be adapted to, e.g. by means of a performing unit 1008, perform channel estimation based on the UL reference signal.

The embodiments herein in the APU 103 may be implemented through one or more processors, such as a processor 1010 in the APU 103 depicted in FIG. 16, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the APU 103. One such carrier may be in the form of a CD ROM disc. It is however feasible with other data carriers such as a memory stick. The computer program code may furthermore be provided as pure program code on a server and downloaded to the APU 103.

The APU 103 may further comprise a memory 1013 comprising one or more memory units. The memory 1013 is arranged to be used to store obtained information, store data, configurations, schedulings, and applications etc. to perform the methods herein when being executed in the APU 103.

The APU 103 may receive information from, e.g. the UE 125, through a receiving port 1015. The receiving port 1015 may be, for example, connected to one or more antennas in APU 103. The APU 103 may receive information from another structure in the communications system 100 through the receiving port 1015. Since the receiving port 1015 may be in communication with the processor 1010, the receiving port 1015 may then send the received information to the processor 1010. The receiving port 1015 may also be configured to receive other information.

The processor 1010 in the APU 103 may be further configured to transmit or send information to e.g. UE 125, another structure in the communications system 100, through a sending port 1018, which may be in communication with the processor 1010, and the memory 1013.

As mentioned above, the APU 103 may comprise the determining unit 1001, the transmitting unit 1003, the receiving unit 1005, the performing unit 1008, other units 1009 etc.

Those skilled in the art will also appreciate that the determining unit 1001, the transmitting unit 1003, the receiving unit 1005, the performing unit 1008, other units 1009 described above may refer to a combination of analog and digital circuits, and/or one or more processors configured with software and/or firmware, e.g., stored in memory, that, when executed by the one or more processors such as the processor 1010, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

The different units 1001-1009 described above may be implemented as one or more applications running on one or more processors such as the processor 1010.

Thus, the methods according to the embodiments described herein for the APU 103 may be respectively implemented by means of a computer program 1020 product, comprising instructions, i.e., software code portions, which, when executed on at least one processor 1010, cause the at least one processor 1010 to carry out the actions described herein, as performed by the APU 103 The computer program 1020 product may be stored on a computer-readable storage medium 1025. The computer-readable storage medium 1025, having stored thereon the computer program 1020, may comprise instructions which, when executed on at least one processor 1010, cause the at least one processor 1010 to carry out the actions described herein, as performed by the APU 103. In some embodiments, the computer-readable storage medium 1025 may be a non-transitory computer-readable storage medium, such as a CD ROM disc, or a memory stick. In other embodiments, the computer program 1020 product may be stored on a carrier containing the computer program 1020 just described, wherein the carrier is one of an electronic signal, optical signal, radio signal, or the first computer-readable storage medium 508, as described above.

The APU 103 may comprise a communication interface configured to facilitate communications between the APU 103 and other nodes or devices, e.g., the UE 125, or another structure. The interface may, for example, include a transceiver configured to transmit and receive radio signals over an air interface in accordance with a suitable standard.

The APU 103 may comprise the following arrangement depicted in FIG. 17 . The APU 103 may comprise a processing circuitry 1010, e.g., one or more processors such as the processor 1010, in the UE 125 and the memory 1013. The APU 103 may also comprise a radio circuitry 1030, which may comprise e.g., the receiving port 1015 and the sending port 1018. The processing circuitry 1010 may be configured to, or operable to, perform the method actions according to FIGS. 7-9 and 14 in a similar manner as that described in relation to FIG. 100a. The radio circuitry 1030 may be configured to set up and maintain at least a wireless connection with the APU 103. Circuitry may be understood herein as a hardware component.

Hence, embodiments herein also relate to the APU 103 operative to operate in the communications system 100. The APU 103 may comprise the processing circuitry 1010 and the memory 1013, the memory 1013 comprising instructions executable by the processing circuitry 1010, whereby the APU 103 is further operative to perform the actions described herein in relation to the APU 103, e.g., in FIGS. 7-9.

Figure 18:
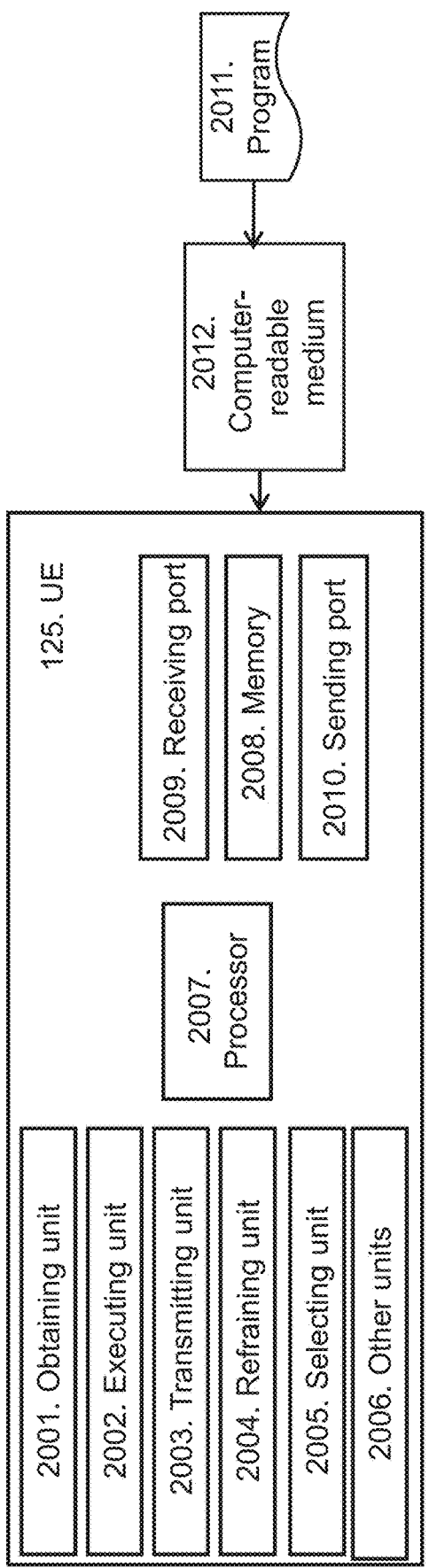
FIG. 18 is a schematic drawing illustrating an example of a UE.
Figure 19:
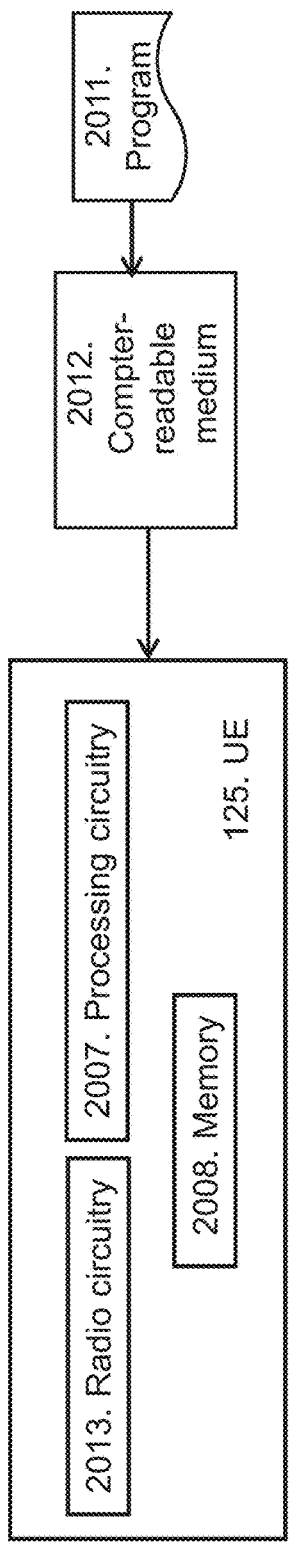
FIG. 19 is a schematic drawing illustrating an example of a UE.

To perform the method steps shown in FIGS. 7-9 and 15 for for handling data transmissions in a distributed massive MIMO communication system 100, the UE 125 comprises an arrangement as shown in FIG. 18 and FIG. 19.

The UE 125 is adapted to, e.g. by means of a receiving unit 2001, receive a DL reference signal pre-coded with a first pre-coding configuration from a plurality of APUs 103 comprised in at least two groups of non-co-located APUs 103 in the system 100. One APU may be comprised in a first APU group and another APU may be comprised in a second APU group.

The UE 125 is adapted to, e.g. by means of a determining unit 2003, determine phase difference between the received DL reference signals.

The UE 125 is adapted to, e.g. by means of the determining unit 2003, determine least one phase adjustment parameter based on the determined phase difference. N−1 phase adjustment parameters may be determined, where N is a number of groups of APUs 103, and where N is an integer. One phase adjustment parameter may be determined when the UE 125 and each of the APUs 103 in the plurality have previously agreed on a code book comprising one or more phase adjustment parameters The UE 125 is adapted to, e.g. by means of a transmitting unit 2005, transmit information indicating the at least one phase adjustment parameter to at least one APU 103 in the plurality. The information indicating the at least one phase adjustment parameter may be a value of the phase adjustment parameter or a reference to a code book comprising one or more phase adjustment parameters. The code book may be a first code book or a second code book. The second codebook may be associated with a granularity that is different than the first codebook and associated with smaller phase differences than the first code book.

The UE 125 is adapted to, e.g. by means of the receiving unit 2001, receive DL data pre-coded with a second pre-coding configuration from each of the APUs 103 in the plurality.

The UE 125 may be adapted to, e.g. by means of the transmitting unit 2005, transmit an UL reference signal to each of the APUs in the plurality.

The embodiments herein in the UE 125 may be implemented through one or more processors, such as a processor 2010 in the UE 125 depicted in FIG. 18 , together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the UE 125. One such carrier may be in the form of a CD ROM disc. It is however feasible with other data carriers such as a memory stick. The computer program code may furthermore be provided as pure program code on a server and downloaded to the UE 125.

The UE 125 may further comprise a memory 2013 comprising one or more memory units. The memory 2013 is arranged to be used to store obtained information, store data, configurations, schedulings, and applications etc. to perform the methods herein when being executed in the UE 125.

The UE 125 may receive information from, e.g., the APU 103, through a receiving port 2015. The receiving port 2015 may be, for example, connected to one or more antennas in UE 125. The UE 125 may receive information from another structure in the communications system 100 through the receiving port 2015. Since the receiving port 2015 may be in communication with the processor 2010, the receiving port 2015 may then send the received information to the processor 2010. The receiving port 2015 may also be configured to receive other information.

The processor 2010 in the network UE 125 may be further configured to transmit or send information to e.g. the APU 103, or another structure in the communications system 100, through a sending port 2018, which may be in communication with the processor 2010, and the memory 2013.

As mentioned above, the UE 125 may comprise a receiving unit 201, determining unit 2003, transmitting unit 2005, other units 2008 etc.

Those skilled in the art will also appreciate that the receiving unit 201, determining unit 2003, transmitting unit 2005, other units 2008 etc. described above may refer to a combination of analog and digital circuits, and/or one or more processors configured with software and/or firmware, e.g., stored in memory, that, when executed by the one or more processors such as the processor 2010, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SOC).

The different units 2001-2008 described above may be implemented as one or more applications running on one or more processors such as the processor 2010.

Thus, the methods described herein for the UE 125 may be respectively implemented by means of a computer program 2020 product, comprising instructions, i.e., software code portions, which, when executed on at least one processor 2010, cause the at least one processor 2010 to carry out the actions described herein, as performed by the UE 125. The computer program 2020 product may be stored on a computer-readable storage medium 2025. The computer-readable storage medium 2025, having stored thereon the computer program 2020, may comprise instructions which, when executed on at least one processor 2010, cause the at least one processor 2010 to carry out the actions described herein, as performed by the UE 125. The computer-readable storage medium 2025 may be a non-transitory computer-readable storage medium, such as a CD ROM disc, or a memory stick. In other embodiments, the computer program 2020 product may be stored on a carrier containing the computer program 2020 just described, wherein the carrier is one of an electronic signal, optical signal, radio signal, or the second computer-readable storage medium 2025, as described above.

The UE 125 may comprise a communication interface configured to facilitate communications between the UE 125 and other nodes or devices, e.g., the APU 103, or another structure. The interface may, for example, include a transceiver configured to transmit and receive radio signals over an air interface in accordance with a suitable standard.

The UE 125 may comprise the following arrangement depicted in FIG. 19 . The UE 125 may comprise a processing circuitry 2010, e.g., one or more processors such as the processor 2010, in the UE 125 and the memory 2013. The UE 125 may also comprise a radio circuitry 2030, which may comprise e.g., the receiving port 2015 and the sending port 2018. The processing circuitry 2010 may be configured to, or operable to, perform the method actions according to FIGS. 7-9 and 15 in a similar manner as that described in relation to FIG. 200a. The radio circuitry 2030 may be configured to set up and maintain at least a wireless connection with the APU 103. Circuitry may be understood herein as a hardware component.

The UE 125 may be operative to operate in the communications system 100. The UE 125 may comprise the processing circuitry 2010 and the memory 2013. The memory 2013 comprises instructions executable by the processing circuitry 2010. The UE 125 is operative to perform the actions described herein in relation to the UE 125, e.g., in FIGS. 7-9 and 15.

Further Extensions And Variations

Telecommunication network connected via an intermediate network to a host computer in accordance with some embodiments.

Figure 20:
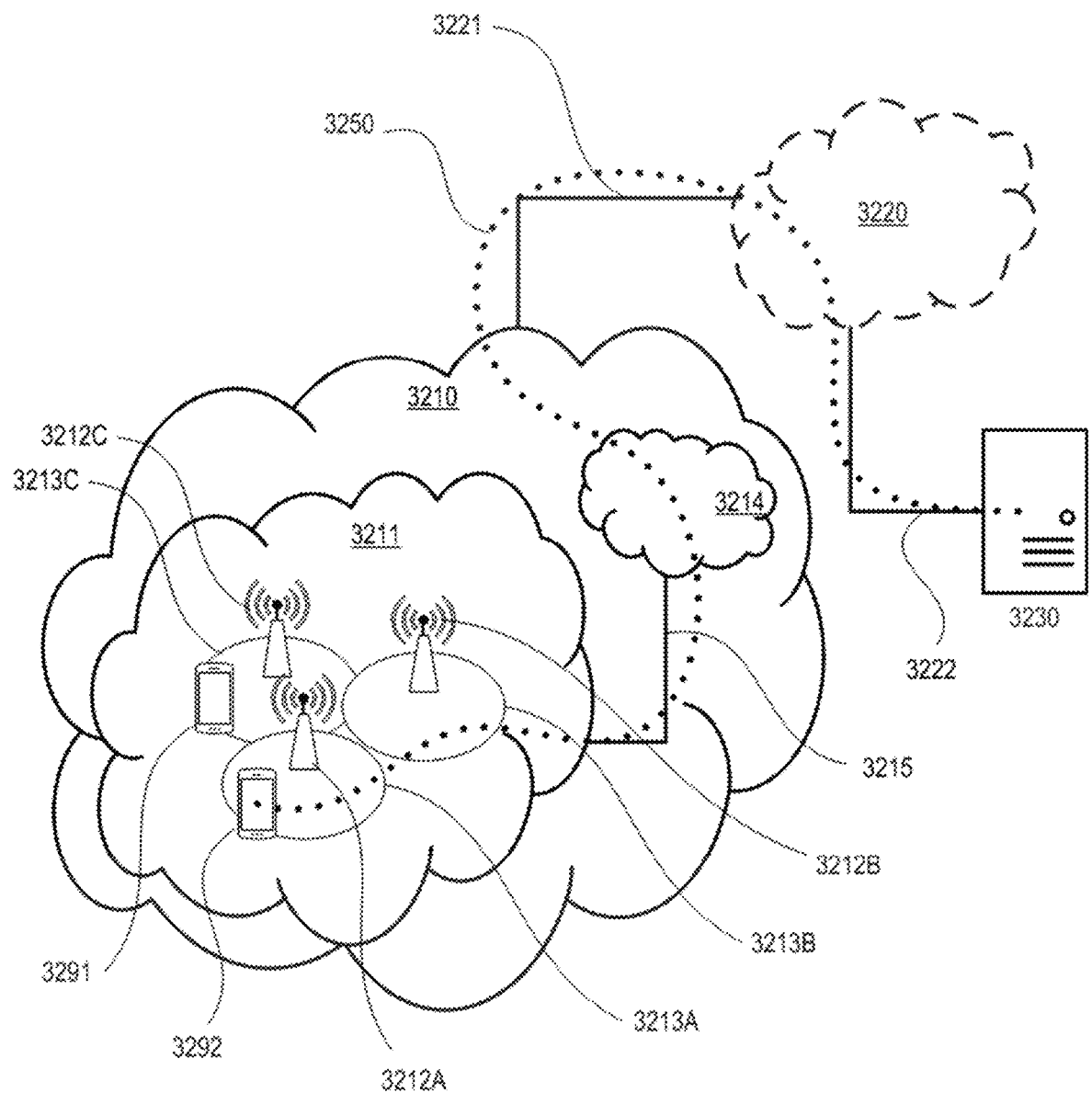
FIG. 20 is a schematic block diagram illustrating a telecommunication network connected via an intermediate network to a host computer.

With reference to FIG. 20, in accordance with an embodiment, a communication system includes telecommunication network 3210 such as the communications system 100, for example, a 3GPP-type cellular network, which comprises access network 3211, such as a radio access network, and core network 3214. Access network 3211 comprises a plurality of network nodes. For example, base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A plurality of user equipments, such as the UE 125 may be comprised in the communications system 100. In FIG. 20, a first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212. Any of the UEs 3291, 3292 may be considered examples of the UE 125.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 20 as a whole enables connectivity between the connected UEs 3291, 3292 and host computer 3230. The connectivity may be described as an Over-The-Top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

In relation to FIGS. 21-25 which are described next, it may be understood that the base station may be considered an example of the first network node 103.

FIG. 330 illustrates an example of host computer communicating via a network node with a UE 125 over a partially wireless connection in accordance with some embodiments The UE 125 and the network node, e.g., an APU 103, a base station and host computer discussed in the preceding paragraphs will now be described with reference to FIG. 330. In communication system 3330, such as the communications system 100, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Figure 21:
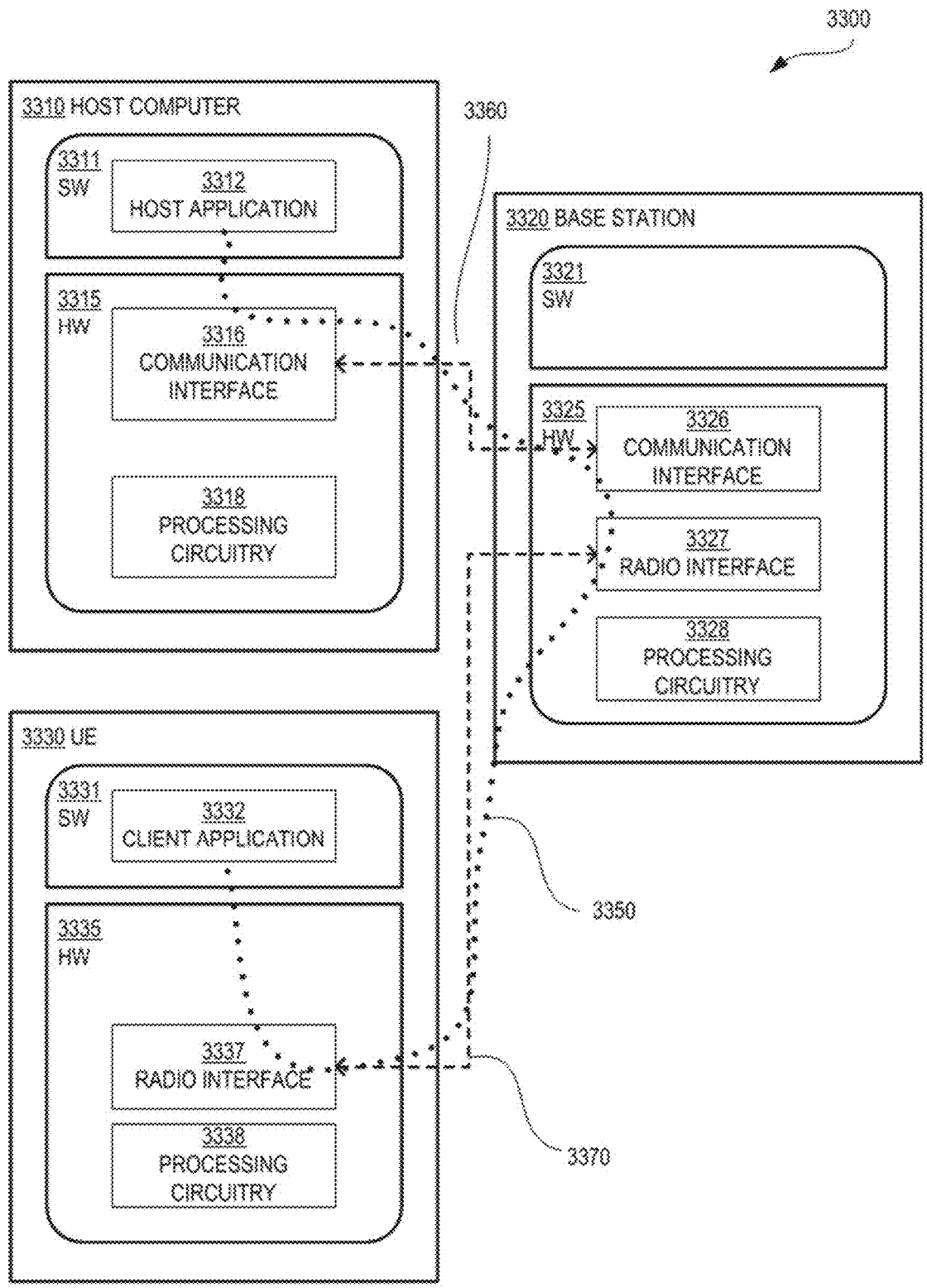
FIG. 21 is a schematic block diagram of a host computer communicating via a base station with a UE over a partially wireless connection.

Communication system 3300 further includes the network node exemplified in FIG. 21 as a base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with the UE 125, exemplified in FIG. 21 as a UE 3330 located in a coverage area served by base station 3320. Communication interface 3326 may be configured to facilitate connection 3360 to host computer 3310. Connection 3360 may be direct or it may pass through a core network (not shown in FIG. 21) of the telecommunication system and/or through one or more intermediate networks outside the telecommunication system. Hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. The communication systems' hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

It is noted that host computer 3310, base station 3320 and UE 3330 illustrated in FIG. 21 may be similar or identical to host computer 3230, one of base stations 3212*a*, 3212*b*, 3212*c* and one of UEs 3291, 3292 of FIG. 20, respectively. This is to say, the inner workings of these entities may be as shown in FIG. 21 and independently, the surrounding network topology may be that of FIG. 20.

In FIG. 21, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the spectrum efficiency, and latency, and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. Sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figures 22, 23:
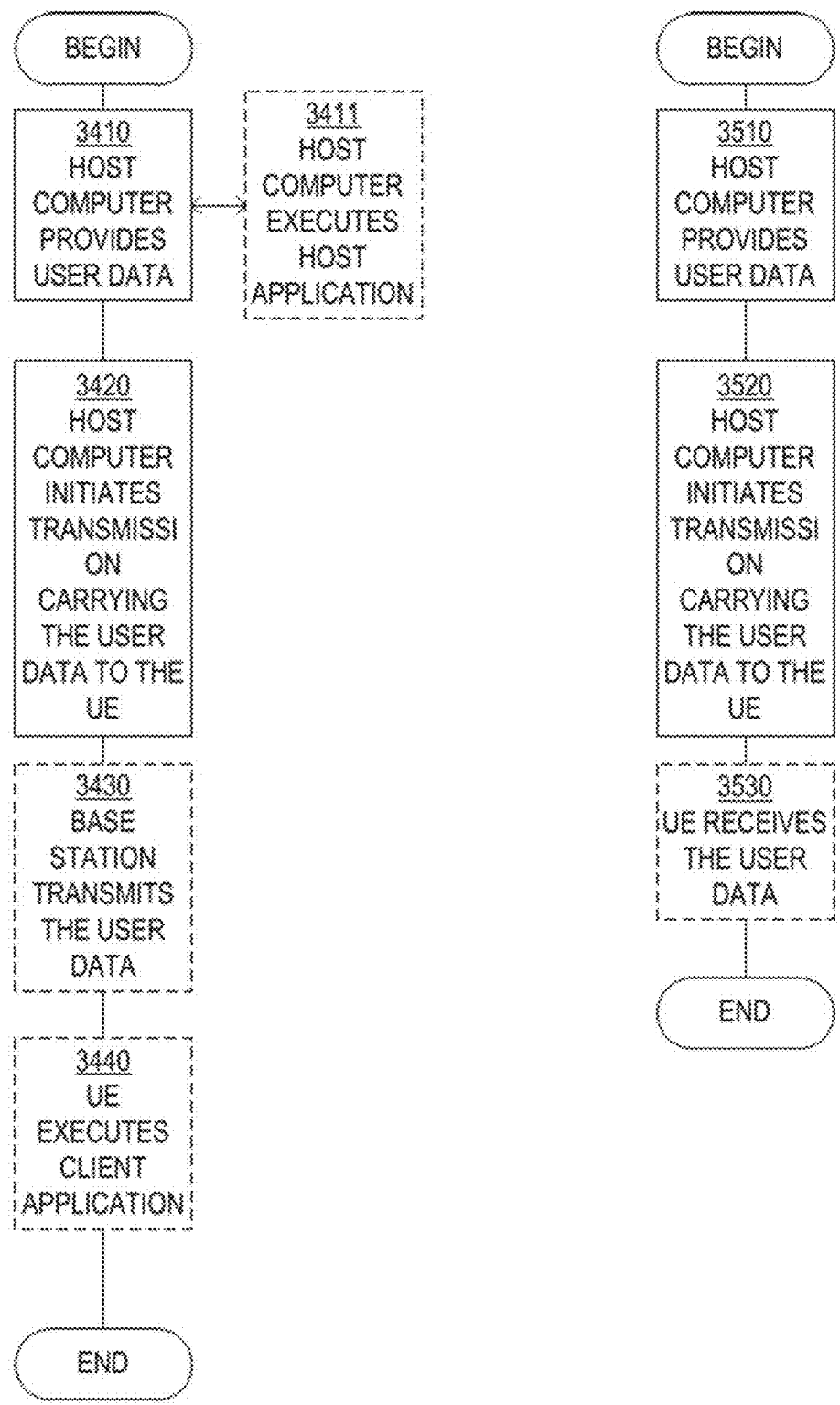
FIG. 22 is a flowchart depicting embodiments of a method in a communications system including a host computer, a base station and a UE.
FIG. 23 is a flowchart depicting embodiments of a method in a communications system including a host computer, a base station and a UE.

FIG. 22 illustrates methods implemented in a communication system including a host computer, a base station and a UE 125. FIG. 22 is a flowchart illustrating a method implemented in a communication system. The communication system includes a host computer, a base station and a UE 125 which may be those described with reference to FIG. 20 and FIG. 21. For simplicity, only drawing references to FIG. 22 will be included in this section. In step 3410, the host computer provides user data. In substep 3411 (which may be optional) of step 3410, the host computer provides the user data by executing a host application. In step 3420, the host computer initiates a transmission carrying the user data to the UE 125. In step 3430 (which may be optional), the base station transmits to the UE 125 the user data which was carried in the transmission that the host computer initiated, in accordance with the teachings of the embodiments described throughout this disclosure. In step 3440 (which may also be optional), the UE 125 executes a client application associated with the host application executed by the host computer.

FIG. 23 illustrates methods implemented in a communication system including a host computer, a base station and a UE 125 in accordance with some embodiments. FIG. 23 is a flowchart illustrating a method implemented in a communication system. The communication system includes a host computer, a base station and a UE 125 which may be those described with reference to FIG. 20 and FIG. 21. For simplicity, only drawing references to FIG. 23 will be included in this section. In step 3510 of the method, the host computer provides user data. In an optional substep (not shown) the host computer provides the user data by executing a host application. In step 3520, the host computer initiates a transmission carrying the user data to the UE 125. The transmission may pass via the base station, in accordance with the teachings of the embodiments described throughout this disclosure. In step 3530 (which may be optional), the UE 125 receives the user data carried in the transmission.

Figures 24, 25:
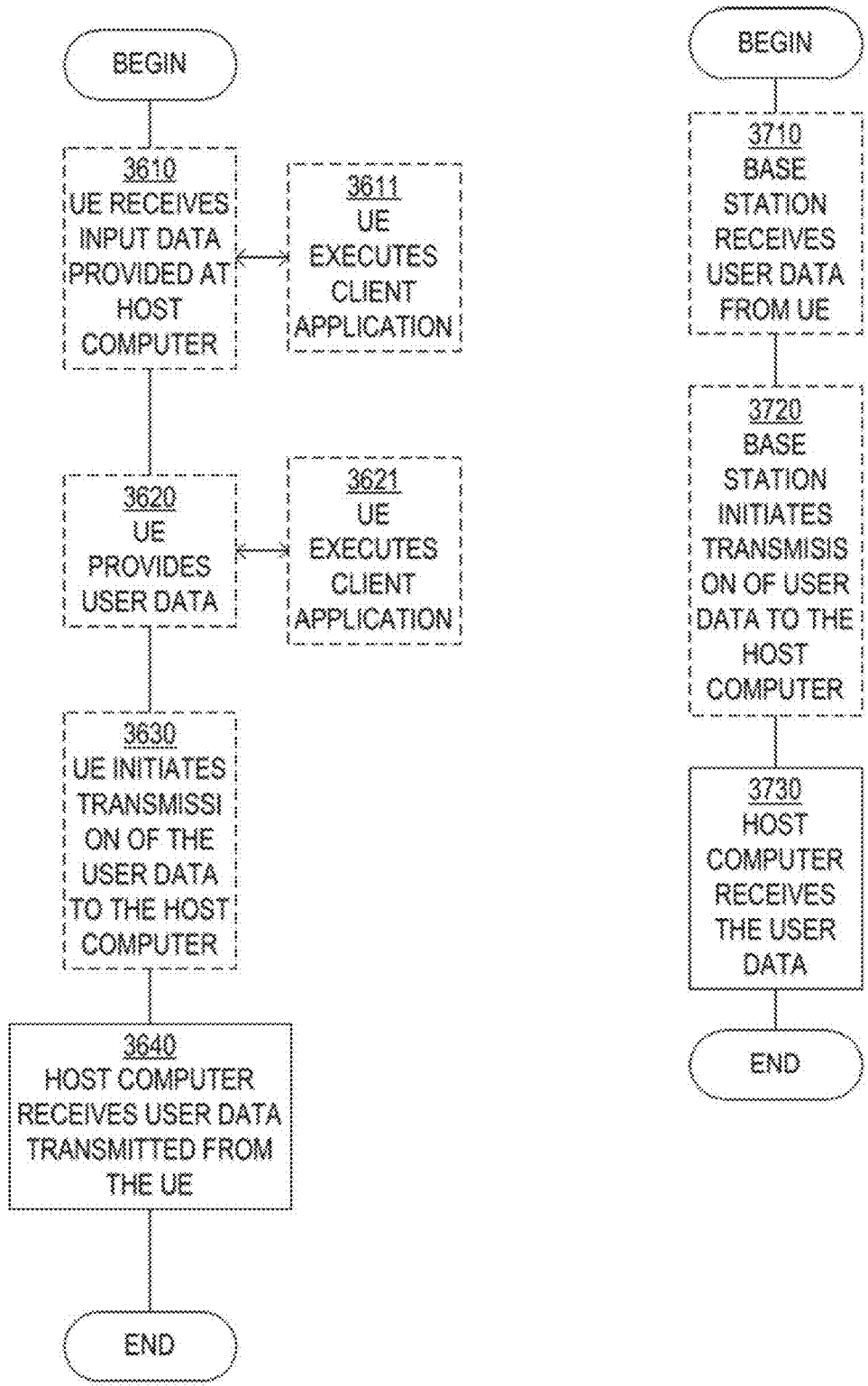
FIG. 24 is a flowchart depicting embodiments of a method in a communications system including a host computer, a base station and a UE.
FIG. 25 is a flowchart depicting embodiments of a method in a communications system including a host computer, a base station and a UE.

FIG. 24 illustrates methods implemented in a communication system including a host computer, a base station and a UE 125. FIG. 24 is a flowchart illustrating a method implemented in a communication system. The communication system includes a host computer, a network node and a UE 125 which may be those described with reference to FIG. 20 and FIG. 21. For simplicity, only drawing references to FIG. 24 will be included in this section. In step 3610 (which may be optional), the UE 125 receives input data provided by the host computer. Additionally or alternatively, in step 3620, the UE 125 provides user data. In substep 3621 (which may be optional) of step 3620, the UE provides the user data by executing a client application. In substep 3611 (which may be optional) of step 3610, the UE 125 executes a client application which provides the user data in reaction to the received input data provided by the host computer. In providing the user data, the executed client application may further consider user input received from the user. Regardless of the specific manner in which the user data was provided, the UE 125 initiates, in substep 3630 (which may be optional), transmission of the user data to the host computer. In step 3640 of the method, the host computer receives the user data transmitted from the UE, in accordance with the teachings of the embodiments described throughout this disclosure.

FIG. 25 illustrates methods implemented in a communication system including a host computer, a base station and a UE 125. FIG. 25 is a flowchart illustrating a method implemented in a communication system. The communication system includes a host computer, a base station and a UE 125 which may be those described with reference to FIG. 20 and FIG. 21. For simplicity, only drawing references to FIG. 25 will be included in this section. In step 3710 (which may be optional), in accordance with the teachings of the embodiments described throughout this disclosure, the base station receives user data from the UE 125. In step 3720 (which may be optional), the base station initiates transmission of the received user data to the host computer. In step 3730 (which may be optional), the host computer receives the user data carried in the transmission initiated by the base station.

Some embodiments may be summarized as follows:

An APU 103 configured to communicate with a UE 125, the base station comprising a radio interface and processing circuitry configured to perform one or more of the actions described herein as performed by the APU 103.

A communication system 100 including a host computer comprising:
processing circuitry configured to provide user data; and
a communication interface configured to forward the user data to a cellular network for transmission to a UE 125,
wherein the cellular network comprises an APU 103 having a radio interface and processing circuitry, the APU 103 processing circuitry configured to perform one or more of the actions described herein as performed by the APU 103.

The communication system may further including the APU 103.

The communication system may further include the UE 125, wherein the UE 125 is configured to communicate with the APU 103.

The communication system, wherein:
the processing circuitry of the host computer is configured to execute a host application, thereby providing the user data; and
the UE 125 comprises processing circuitry configured to execute a client application associated with the host application.

A method implemented in an APU 103, comprising one or more of the actions described herein as performed by the APU 103.

A method implemented in a communication system 100 including a host computer, an APU 103 and a UE 125, the method comprising:
at the host computer, providing user data; and
at the host computer, initiating a transmission carrying the user data to the UE 125 via a cellular network comprising the APU 103, wherein the APU 103 performs one or more of the actions described herein as performed by the APU 103.

The method may further comprise:
at the APU 103, transmitting the user data.

The user data may be provided at the host computer by executing a host application, and the method may further comprise:
at the UE 125, executing a client application associated with the host application.

A UE 125 configured to communicate with an APU 103, the UE 125 comprising a radio interface and processing circuitry configured to perform one or more of the actions described herein as performed by the UE 125.

A communication system 100 including a host computer comprising:
processing circuitry configured to provide user data; and
a communication interface configured to forward user data to a cellular network for transmission to a UE 125,
wherein the UE 125 comprises a radio interface and processing circuitry, the UE's processing circuitry configured to perform one or more of the actions described herein as performed by the UE 125.

The communication system 100 may further including the UE 125.

The communication system 100, wherein the cellular network further includes an APU 103 configured to communicate with the UE 125.

The communication system 100, wherein:
the processing circuitry of the host computer is configured to execute a host application, thereby providing the user data; and
the UE's processing circuitry is configured to execute a client application associated with the host application.

A method implemented in a UE 125, comprising one or more of the actions described herein as performed by the UE 125.

A method implemented in a communication system 100 including a host computer, APU 103 and a UE 125, the method comprising:
at the host computer, providing user data; and
at the host computer, initiating a transmission carrying the user data to the UE 125 via a cellular network comprising the APU 103, wherein the UE 125 performs one or more of the actions described herein as performed by the UE 125.

The method may further comprise:
at the UE 125, receiving the user data from the APU 103.

A UE 125 configured to communicate with an APU 103, the UE 125 comprising a radio interface and processing circuitry configured to perform one or more of the actions described herein as performed by the UE 125.

A communication system 100 including a host computer comprising:
a communication interface configured to receive user data originating from a transmission from a UE 125 to a APU 103,
wherein the UE 125 comprises a radio interface and processing circuitry, the UE's processing circuitry configured to: perform one or more of the actions described herein as performed by the UE 125.

The communication system 100 may further include the UE 125.

The communication system 100 may further include the APU 103. The APU 103 comprises a radio interface configured to communicate with the UE 125 and a communication interface configured to forward to the host computer the user data carried by a transmission from the UE 125 to the APU 103.

The communication system 100, wherein:
the processing circuitry of the host computer is configured to execute a host application; and
the UE's processing circuitry is configured to execute a client application associated with the host application, thereby providing the user data.

The communication system 100, wherein:
the processing circuitry of the host computer is configured to execute a host application, thereby providing request data; and
the UE's processing circuitry is configured to execute a client application associated with the host application, thereby providing the user data in response to the request data.

A method implemented in a UE 125 comprising one or more of the actions described herein as performed by the UE 125.

The method may further comprise:
providing user data; and
forwarding the user data to a host computer via the transmission to the APU 103.

A method implemented in a communication system 100 including a host computer, an APU 103 and a UE 125, the method comprising:
at the host computer, receiving user data transmitted to the APU 103 from the UE 125, the UE 125 performs one or more of the actions described herein as performed by the UE 125.

The method may further comprise:
at the UE 125, providing the user data to the APU 103.

The method may further comprise:
at the UE 125, executing a client application, thereby providing the user data to be transmitted; and
at the host computer, executing a host application associated with the client application.

The method may further comprise:
at the UE 125, executing a client application; and
at the UE 125, receiving input data to the client application, the input data being provided at the host computer by executing a host application associated with the client application,
wherein the user data to be transmitted is provided by the client application in response to the input data.

An APU 103 configured to communicate with a UE 125, the APU 103 comprising a radio interface and processing circuitry configured to perform one or more of the actions described herein as performed by the APU 103.

A communication system 100 including a host computer comprising a communication interface configured to receive user data originating from a transmission from a UE 125 to a base station, wherein the APU 103 comprises a radio interface and processing circuitry, the base station's processing circuitry configured to perform one or more of the actions described herein as performed by the APU 103.

The communication system 100 may further include the APU 103.

The communication system 100 may further include the UE 125, wherein the UE 125 is configured to communicate with the APU 103.

The communication system 100 wherein:
the processing circuitry of the host computer is configured to execute a host application;
the UE 125 is configured to execute a client application associated with the host application, thereby providing the user data to be received by the host computer.

A method implemented in an APU 103, comprising one or more of the actions described herein as performed by any of the APU 103.

A method implemented in a communication system including a host computer, an APU 103 and a UE 125, the method comprising:
at the host computer, receiving, from the APU 103, user data originating from a transmission which the APU 103 has received from the UE 125, wherein the UE 125 performs one or more of the actions described herein as performed by the UE 125.

The method may further comprise:
at the APU 103, receiving the user data from the UE 125.

The method may further comprise:
at the APU 103, initiating a transmission of the received user data to the host computer.

Summarized, the embodiments herein teaches a method for achieving phase coherent transmission in a distributed massive MIMO system 100 for the case when reciprocity-based phase coherent transmission beamforming is only possible within one group of APUs 103, e.g. one antenna stripe 101, one APU 103, one segment of a radio stripe 101, or a certain length of a radio stripe 101 where the phase error is within a threshold.

The embodiments herein relate to a method to achieve large distance phase coherent transmission in a (semi-) distributed large scale MIMO system 100. The method is based on that reciprocity-based phase coherent transmission may be achieved only within a group of adjacent and nearby APUs 103, e.g. within an antenna stripe 101, within an APU 103, or within a section of a radio stripe 101. To achieve phase-coherent transmission from different non-adjacent and/or non-collocated groups of APUs 103, feedback from UEs 125 is relied on to align the transmitted phases. Observe that within a radio stripe 101, the phase may drift in a continuous manner. Herein, phase coherent is understood as a section where the phase drift is within some limit, e.g. 30 degrees.

It is assumed that phase coherent transmission is only possible within one radio stripe 101 and not between radio stripes 101. The methods described herein are also applicable when the phase coherency is instead only possible within an APU 103 and not between APUs 103.

The embodiments herein relate to distributed MIMO, cell-free Massive MIMO and radio stripes.

The embodiments herein relate to intra and inter-group pre-coding in distributed massive MIMO.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step.

Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third", "fourth", and/or "fifth" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments The embodiments herein are not limited to the above described embodiments. Various alternatives, modifications and equivalents may be used. Therefore, the above embodiments should not be taken as limiting the scope of the embodiments. A feature from one embodiment may be combined with one or more features of any other embodiment.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods may, without departing from the embodiments herein, be performed in another order than the order in which they appear herein.

The invention claimed is:

1. A method performed by an Antenna Processing Unit, APU for handling data transmissions in a distributed massive Multiple Input Multiple Output, MIMO, communication system, wherein the APU is comprised in one of at least two non-co-located groups of APUs in the system, the method comprising:
   determining a first pre-coding configuration and a Downlink, DL, reference signal;
   transmitting, to a User Equipment, UE, the DL reference signal pre-coded with the first pre-coding configuration;
   receiving information indicating a value of at least one phase adjustment parameter from the UE;
   determining a second pre-coding configuration based on the first precoding configuration adjusted with the at least one phase adjustment parameter;
   transmitting data pre-coded with the second pre-coding configuration to the UE; and
   each of the at least two non-co-located groups of APUs being comprised in a respective radio stripe or cable.

2. The method according to claim 1, comprising:
   receiving an uplink, UL, reference signal, from the UE; and
   performing channel estimation based on the UL reference signal;
   and wherein the first pre-coding configuration is determined based on the channel estimation.

3. The method according to claim 2, wherein the first pre-coding configuration is determined by selecting the first pre-coding configuration from a plurality of candidate pre-coding configurations.

4. The method according to claim 1, wherein the APU and the UE have previously agreed on a code book comprising one or more phase adjustment parameters.

5. The method according to claim 1, wherein the APU and other APUs in the at least two non-co-located groups are connected to a processing unit through a fronthaul.

6. A method performed by a User Equipment, UE, for handling data transmissions in a distributed massive Multiple Input Multiple Output, MIMO, communication system, the method comprising:
   receiving a Downlink, DL, reference signal pre-coded with a first precoding configuration from a plurality of Antenna Processing Units, APUs comprised in at least two groups of non-co-located APUs in the system, each of the at least two groups of non-co-located APUs being comprised in a respective radio stripe or cable;
   determining a phase difference between the received DL reference signal;
   determining at least one phase adjustment parameter based on the determined phase difference;

transmitting information indicating a value of the at least one phase adjustment parameter to at least one APU in the plurality of APUs; and receiving DL data pre-coded with a second pre-coding configuration from each of the plurality of APUs.

7. The method according to claim 6, comprising:
transmitting an uplink, UL, reference signal, to each of the plurality of APUs.

8. The method according to claim 6, wherein N-I phase adjustment parameters are determined, where N is a number of groups of APUs.

9. The method according to claim 6, wherein one phase adjustment parameter is determined when the UE and each of the plurality of APUs have previously agreed on a code book comprising one or more phase adjustment parameters.

10. An Antenna Processing Unit, APU for handling data transmissions in a distributed massive Multiple Input Multiple Output, MIMO, communication system, wherein the APU is comprised in one of at least two non-co-located groups of APUs in the system, the APU being adapted to:
determine a first pre-coding configuration and a Downlink, DL, reference signal;
transmit, to a User Equipment, UE, the DL reference signal pre-coded with the first pre coding configuration;
receiving information indicating a value of at least one phase adjustment parameter from the UE;
determine a second pre-coding configuration based on the first pre-coding configuration adjusted with the at least one phase adjustment parameter;
transmit DL data pre-coded with the second pre-coding configuration to the UE; and
each of the at least two non-co-located groups of APUs being comprised in a respective radio stripe or cable.

11. The APU according to claim 10, adapted to:
receive an uplink, UL, reference signal, from the UE; and to
perform channel estimation based on the UL reference signal; and
wherein the first pre-coding configuration is determined based on the channel estimation.

12. The APU according to claim 11, wherein the first pre-coding configuration is determined by selecting the first pre-coding configuration from a plurality of candidate first pre-coding configurations.

13. The APU according to claim 10, wherein the APU and the UE have previously agreed on a code book comprising one or more phase adjustment parameters.

14. A User Equipment, UE, for handling data transmissions in a distributed massive Multiple Input Multiple Output, MIMO, communication system, the UE being adapted to:
receive a Downlink, DL, reference signal pre-coded with a first pre-coding configuration from a plurality of Antenna Processing Units, APUs comprised in at least two groups of non-co-located APUs in the system, each of the at least two groups of non-co-located APUs being comprised in a respective radio stripe or cable;
determine a phase difference between the received DL reference signal;
determine least one phase adjustment parameter based on the determined phase difference;
transmit information indicating a value of the at least one phase adjustment parameter to at least one APU in the plurality of APUs; and to
receive DL data pre-coded with a second pre-coding configuration from each of the APUs in the plurality.

15. The UE according to claim 14, adapted to:
transmit an uplink, UL, reference signal, to each of the APUs in the plurality.

16. The UE according to claim 14, wherein N-I phase adjustment parameters are determined, where N is a number of groups of APUs.

17. The UE according to claim 14, wherein one phase adjustment parameter is determined when the UE and each of the APUs in the plurality have previously agreed on a code book comprising one or more phase adjustment parameters.

* * * * *